(12) United States Patent
Iwamura

(10) Patent No.: US 11,704,113 B2
(45) Date of Patent: Jul. 18, 2023

(54) PROGRAM DEVELOPMENT DEVICE, PROJECT CREATION METHOD, AND STORAGE MEDIUM

(71) Applicant: OMRON Corporation, Kyoto (JP)

(72) Inventor: Shintaro Iwamura, Kyoto (JP)

(73) Assignee: OMRON Corporation, Kyoto (JP)

( * ) Notice: Subject to any disclaimer, the term of this patent is extended or adjusted under 35 U.S.C. 154(b) by 25 days.

(21) Appl. No.: 17/634,247

(22) PCT Filed: Mar. 3, 2020

(86) PCT No.: PCT/JP2020/008954
§ 371 (c)(1),
(2) Date: Feb. 10, 2022

(87) PCT Pub. No.: WO2021/044650
PCT Pub. Date: Mar. 11, 2021

(65) Prior Publication Data
US 2022/0326943 A1     Oct. 13, 2022

(30) Foreign Application Priority Data
Sep. 4, 2019  (JP) .................................. 2019-160899

(51) Int. Cl.
G06F 8/71     (2018.01)
G05B 19/05    (2006.01)
G06F 8/36     (2018.01)

(52) U.S. Cl.
CPC ............. *G06F 8/71* (2013.01); *G05B 19/056* (2013.01); *G06F 8/36* (2013.01)

(58) Field of Classification Search
None
See application file for complete search history.

(56) References Cited

U.S. PATENT DOCUMENTS 6,286,017 B1 * 9/2001 Egilsson ................... G06F 8/34
                                                       715/234
9,146,652 B1 * 9/2015 Danielsson ............. G06F 30/20
(Continued)

FOREIGN PATENT DOCUMENTS

JP      H04205355      7/1992
JP      H0969041       3/1997
(Continued)

OTHER PUBLICATIONS

Haki, "Groovy Goodness: Solve Naming Conflicts with Builders", 2012, https://blog.mrhaki.com/2012/01/groovy-goodness-solve-naming-conflicts.html (Year: 2012).*
(Continued)

*Primary Examiner* — Hossain M Morshed
(74) *Attorney, Agent, or Firm* — JCIPRNET

(57) ABSTRACT

This program development device comprises: a storage unit which holds a project; and an update means which imports one or a plurality of program modules into the project. Each of the program modules contains a program, and can define a first variable which is a variable that can be referenced among all program modules, a second variable which is a variable that can be referenced among the plurality of program modules, and a third variable which is a variable referenced in each program module. The update means maintains the variable name of the first variable contained in the imported program module, and when the variable name of the second variable contained in the imported program module overlaps the variable name of the second variable contained in any of the program modules of the project, the update means accepts a change of the overlapping variable name.

20 Claims, 20 Drawing Sheets

(56) References Cited

U.S. PATENT DOCUMENTS

| | | | | |
|---|---|---|---|---|
| 2006/0095893 A1* | 5/2006 | Vahid | ............ | H04Q 9/00 717/109 |
| 2009/0043844 A1* | 2/2009 | Zimmet | ............ | G06Q 10/107 709/204 |
| 2011/0153787 A1* | 6/2011 | Baker | ............ | H04L 61/3005 709/221 |
| 2014/0259005 A1* | 9/2014 | Jeffrey | ............ | G06F 8/65 717/173 |
| 2018/0246703 A1* | 8/2018 | Ren | ............ | G06F 8/20 |
| 2021/0255881 A1* | 8/2021 | Arai | ............ | G06F 8/437 |

FOREIGN PATENT DOCUMENTS

| | | |
|---|---|---|
| JP | 2001109632 | 4/2001 |
| JP | 2009193181 | 8/2009 |
| JP | 2010049484 | 3/2010 |

OTHER PUBLICATIONS

"International Search Report (Form PCT/ISA/210) of PCT/JP2020/008954," dated Jun. 2, 2020, with English translation thereof, pp. 1-4.

"Written Opinion of the International Searching Authority (Form PCT/ISA/237)" of PCT/JP2020/008954, dated Jun. 2, 2020, with English translation thereof, pp. 1-6.

\* cited by examiner

160

++N=ModuleA
+++I=8e9e37bc-291c-462e-946b-52f85d48661c                                        166                   168
+++I=b712998d-1d72-4bba-871d-928f5d80414d                                         ↙                    ↙
+++I=5782d905-1c39-4f5a-bd2c-682697dc92bd        N=Program0    C=True
(E001) : Offline                                 N=Section0    C=True
++++I=85725834-fc48-466e-8781-8f761304e208       N=Node1 : R88D-1SAN02H-ECT
++++I=eefb0f19-4043-44ef-a7e1-045bf03ed96d       N=Parameters
++++I=2727a35c-da96-4002-ba0a-df5273494751       N=FFT
++++I=67123fcf-8bff-42f0-a0b6-2d27e8ee671a       N=Data Trace Settings
++++I=6619d53d-b1c8-4cf1-99c5-6c5544788185       N=Node2 : GX-ID1611+ID08 (E002)
++++I=408314b9-5a90-4b91-a071-d942c625222a       N=Parameter
++++I=85755ae8-ed5b-4de0-a555-75f4c22d2a21       N=Global Variables
                                                 N=Page0

172
+GN=VAR_GLOBAL      GVT=GlobalNamespaceGroup                              ↙
++D=BOOL    N=EStop        G=VAR_GLOBAL M=Common
++D=BOOL    N=ModuleAInput1         G=VAR_GLOBAL M=ModuleA
++D=BOOL    N=ModuleAOutput1        G=VAR_GLOBAL M=ModuleA

| Name | Data Type | Initial Value | AT | Retain | Constant | Network Publish | Comment | Module |
|---|---|---|---|---|---|---|---|---|
| var1 | BOOL | | ECAT://node#1/Read input 1st double word/In Bit00 | ☐ | ☐ | Do not Publish | | Module1 |
| var2 | BOOL | | ECAT://node#1/Read input 1st double word/In Bit01 | ☐ | ☐ | Do not Publish | | Module2A |
| var3 | BOOL | | ECAT://node#1/Read input 1st double word/In Bit02 | ☐ | ☐ | Do not Publish | | Module2B |
| var4 | BOOL | | ECAT://node#1/Read input 1st double word/In Bit03 | ☐ | ☐ | Do not Publish | | Module3A |

FIG. 17

| Cross Reference | | | |
|---|---|---|---|
| Reference Target: 🔍 new_Controller_0_gvar1(User Variable) | | | |
| Item | Location | Detail | Reference |
| gvar1 | Program0.Section0 | 0 | -|- |
| gvar1 | Program0.Section0 | 1 | -|- |
| new_Controller_0_gvar1 | Pages:Page0 | BitLamp0:Expression | new_Controller_0_gvar1 |
| new_Controller_0_gvar1 | Variable Mapping | new_Controller_0_gvar1 | |
| new_Controller_0_gvar1 | Pages:Page0.vb | 3 | new_Controller_0_gvar1=False |

FIG. 20

PROGRAM DEVELOPMENT DEVICE, PROJECT CREATION METHOD, AND STORAGE MEDIUM

CROSS-REFERENCE TO RELATED APPLICATION

This application is a 371 application of the International PCT application serial no. PCT/JP2020/008954, filed on Mar. 3, 2020, which claims the priority benefits of Japan Patent Application No. 2019-160899, filed on Sep. 4, 2019. The entirety of each of the above-mentioned patent applications is hereby incorporated by reference herein and made a part of this specification.

TECHNICAL FIELD

The present invention relates to a program development device, a project creation method, and a storage medium.

BACKGROUND ART

With an increase in the functionality of control devices such as programmable logic controllers (PLCs) which are the basis of Factory Automation (FA), application programs referred to as user programs are also becoming larger in scale. As the scale of programs increases, there is also a need to improve the design efficiency and reusability of programs.

Since user programs executed by a control device include a command for referencing an input and output signal (IO signal) exchanged with a field device group, it is necessary to appropriately correct the command or the like for referencing an IO signal in reusing the user programs. In addition, it is also necessary to appropriately correct variables and the like referenced between programs.

For example, Japanese Patent Laid-Open No. H04-205355 (Patent Literature 1) discloses a technique of, although not directed to a control device, analyzing variable use restriction information for a common variable in a source program, accumulating the restriction information, and inspecting the use of variables in the source program while referencing the accumulated restriction information, to thereby discover erroneous use of the common variable at the stage of the source program.

CITATION LIST

Patent Literature

[Patent Literature 1]
Japanese Patent Application Laid-Open No. H04-205355

SUMMARY OF INVENTION

Technical Problem to be Solved

The technique disclosed in Patent Literature 1 described above only focuses on a common variable used in a source program, and cannot achieve the purpose of improving the design efficiency and reusability of a program in a control device such as a PLC.

One objective of the present invention is to provide a new mechanism capable of improving the design efficiency and reusability of a program executed by the control device.

Solution to Problem

According to an embodiment of the present invention, there is a provided a program development device for providing a development environment for a user program executed by a control device. The program development device includes a storage unit that holds a project including one or a plurality of program modules and an update means for importing one or a plurality of program modules into the project. Each of the program modules includes a program and is able to define a first variable which is a variable that is able to be referenced among all program modules included in the project, a second variable which is a variable that is able to be referenced among a plurality of program modules included in the project, and a third variable which is a variable referenced in each program module. The update means is configured to maintain a variable name of the first variable included in the imported program module, and to, in a case where a variable name of the second variable included in the imported program module overlaps a variable name of the second variable included in any of the program modules of the project, accept a change of the overlapped variable name.

According to such a configuration, in a case where one or a plurality of program modules is imported into an existing project, the first variable included in the imported program module is maintained as it is, and the variable name of the second variable is changed so that there is no overlap, whereby it is possible to improve the design efficiency and reusability of a program.

In a case where the variable name of the second variable included in the imported program module is overlapped, the update means may present the overlapped second variable to a user. According to such a configuration, the user can easily understand which variable needs to undergo a change in its variable name.

In a case where the variable name of the second variable included in the imported program module is overlapped, the update means may change the overlapped second variable in accordance with a naming rule determined in advance. According to such a configuration, even when the user does not manually change the variable name, it is automatically changed to a variable name which is not overlapped.

In a case where a name of the program included in the imported program module overlaps a name of the program included in any of the program modules of the project, the update means may be further configured to accept a change of the overlapped name of the program. According to such a configuration, in a case where one or a plurality of program modules is imported into an existing project, the name of the program included in the imported program module is changed so that there is no overlap, and thus it is possible to improve the design efficiency and reusability of the program.

In a case where the name of the program included in the imported program module is overlapped, the update means may present the overlapped name of the program to a user. According to such a configuration, the user can easily understand which program needs to undergo a change in its name.

In a case where the name of the program included in the imported program module is overlapped, the update means may change the overlapped name of the program in accordance with a naming rule determined in advance. According to such a configuration, even when the user does not manually change the name of the program, it is automatically changed to a variable name which is not overlapped.

Import may be performed in units of a plurality of program modules having a calling relationship. According to such a configuration, it is possible to improve the efficiency of design in the case of expansion of equipment or the like.

Each of the program modules may be able to include a definition of an associated input and output unit. In a case where a definition of the input and output unit included in the imported program module overlaps a definition of the input and output unit included in any of the program modules of the project, the update means may be further configured to accept a change of the overlapped definition of the input and output unit. According to such a configuration, it is possible to appropriately associate the input and output unit with each program module without overlapping the definition of the input and output unit.

According to another embodiment of the present invention, there is a provided a project creation method for creating a project including a user program executed by a control device. The project creation method includes a step of holding a project including one or a plurality of program modules. Each of the program modules includes a program and is able to define a first variable which is a variable that is able to be referenced among all program modules included in the project, a second variable which is a variable that is able to be referenced among a plurality of program modules included in the project, and a third variable which is a variable referenced in each program module. The project creation method further includes a step of accepting import of one or a plurality of program modules into the project, a step of maintaining a variable name of the first variable included in the imported program module, and a step of, in a case where a variable name of the second variable included in the imported program module overlaps a variable name of the second variable included in any of the program modules of the project, accepting a change of the overlapped variable name.

According to still another embodiment of the present invention, there is provided a program for implementing a program development device for providing a development environment for a user program executed by a control device. The program causes a computer to execute a step of holding a project including one or a plurality of program modules. Each of the program modules includes a program and is able to define a first variable which is a variable that is able to be referenced among all program modules included in the project, a second variable which is a variable that is able to be referenced among a plurality of program modules included in the project, and a third variable which is a variable referenced in each program module. The program causes a computer to execute a step of accepting import of one or a plurality of program modules into the project, a step of maintaining a variable name of the first variable included in the imported program module, and a step of, in a case where a variable name of the second variable included in the imported program module overlaps a variable name of the second variable included in any of the program modules of the project, accepting a change of the overlapped variable name.

Effects of Invention

According to the present invention, it is possible to improve the design efficiency and reusability of a program executed by the control device.

BRIEF DESCRIPTION OF DRAWINGS

FIG. 10 is a diagram illustrating a data example of a program module exported in modularized programming according to the present embodiment.

FIG. 11 is a diagram illustrating a data example of a program module exported in modularized programming according to the present embodiment.

FIG. 16 is a diagram illustrating an example of a setting screen for selecting and changing an imported module in modularized programming according to the present embodiment.

FIG. 17 is a diagram illustrating an example of a setting screen for selecting and changing a variable name referenced by an imported program module in modularized programming according to the present embodiment.

FIG. 20 is a diagram illustrating an example of a cross reference which is exported from the HMI in modularized programming according to the present embodiment.

DESCRIPTION OF EMBODIMENTS

Figure 1:
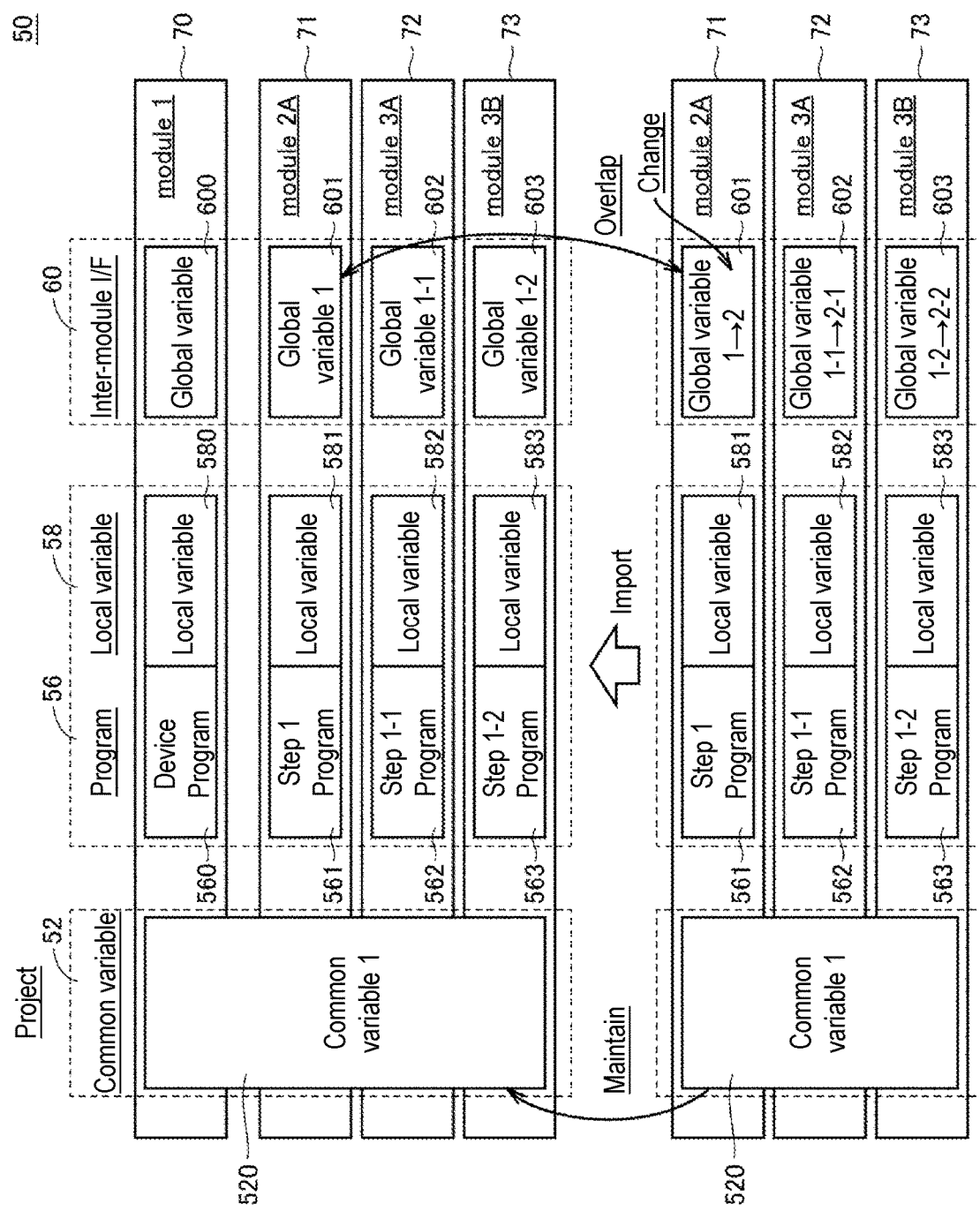
FIG. 1 is a diagram illustrating an outline of a method of creating a project including a user program according to the present embodiment.

An embodiment of the present invention will be described in detail with reference to the accompanying drawings. Meanwhile, the same or equivalent portions in the drawings are denoted by the same reference numerals and signs, and thus description thereof will not be repeated.

A. Application Example

First, an example of a situation in which the present invention is applied will be described.

FIG. 1 is a diagram illustrating an outline of a method of creating a project including a user program according to the present embodiment. Referring to FIG. 1, a project 50 includes a user program which is executed by a control device 100 such as a PLC. More specifically, the project 50 includes programs 560 to 563 as user programs. The programs 560 to 563 are modularized as program modules 70 to 73, respectively.

The program modules 70 to 73 include a common variable 52, an inter-module I/F 60, and a local variable 58 as elements in addition to the programs 560 to 563.

The common variable 52 is a variable (equivalent to a first variable) that can be referenced among all program modules included in the project 50. The inter-module I/F 60 is a variable (equivalent to a second variable) that can be referenced among the plurality of program modules included in the project 50. The local variable 58 is a variable (equivalent to a third variable) which is referenced in each program module.

In each of the program modules 70 to 73, a variable of a type as needed can be defined.

In the example shown in FIG. 1, a common variable 520, local variables 580 to 583, and global variables 600 to 603 are defined in the program modules 70 to 73.

It is assumed that the program modules 71 to 73 are imported (added) to the project 50 shown in FIG. 1. In this case, since the common variable 520 defined in the existing project 50 is also referenced in the imported program modules 71 to 73, the variable name of the common variable 520 is maintained as it is. This makes it possible for all program modules including the imported program modules 71 to 73 to reference the common variable 520.

On the other hand, for the global variables 601 to 603 defined as the inter-module I/F 60, in a case where the same variable name exists in the project 50, the global variables cannot be appropriately referenced, and thus the variable names of the global variables 601 to 603 are appropriately changed so that the variable names do not overlap.

In this way, by appropriately handling the variable names defined in the imported program modules, it is possible to easily import (add) a program module to the project 50 and to sequentially create the project 50.

B. Control System Configuration Example

Next, a configuration example of a control system 1 in which a user program created by a program development device 200 according to the present embodiment is executed will be described.

Figure 2:
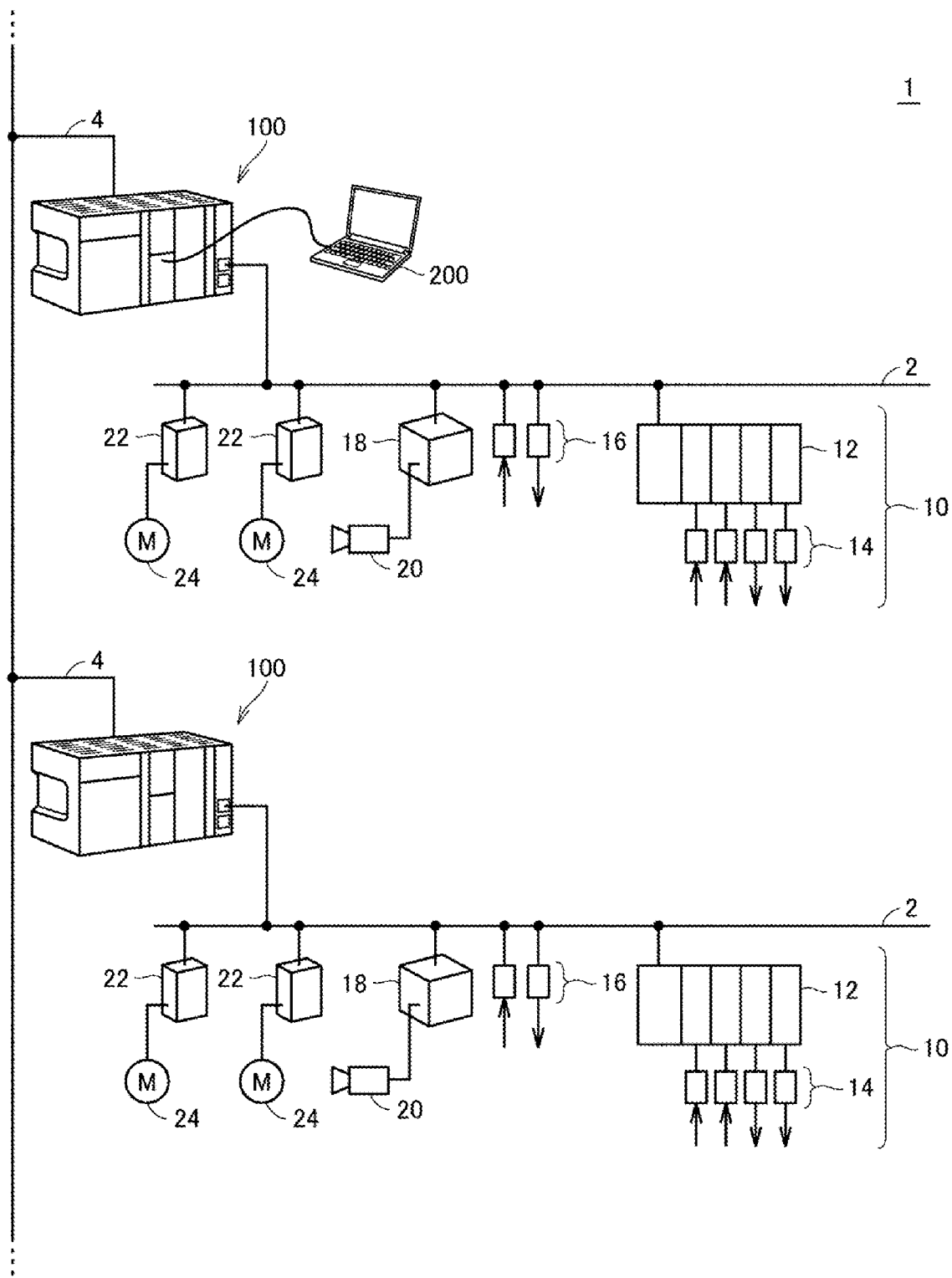
FIG. 2 is a schematic diagram illustrating an overall configuration example of a control system according to the present embodiment.

FIG. 2 is a schematic diagram illustrating an overall configuration example of the control system 1 according to the present embodiment. Referring to FIG. 2, the control system 1 includes one or a plurality of control devices 100.

Each of the control devices 100 executes a control arithmetic for controlling a control target and executes an abnormality detection process for detecting some kind of abnormality that may occur in a monitoring target included in the control target. The control device 100 may be embodied as a kind of computer such as a programmable controller (PLC).

The control device 100 is connected to a field device group 10 through a field bus 2. Further, the control devices 100 are connected to each other through a local network 4. The program development device 200 is connected to the control device 100 in some cases.

As the field bus 2, it is preferable to adopt a network that performs fixed cycle communication in which a time taken until arrival of data is guaranteed. As a network that performs such fixed cycle communication, EtherCAT (registered trademark) or the like is known.

The control device 100 collects data (hereinafter also referred to as an "input value") which is acquired by the field device group 10 and transferred to the control device 100. The field device group 10 includes a device that collects the status value of a control target, a manufacturing device or a production line relevant to control, or the like (hereinafter also collectively referred to as a "field") as an input value.

In the present specification, the "state value" is a term including a value that can be observed by any control target (including a monitoring target), and may include, for example, a physical value that can be measured by any sensor, an ON/OFF state of a relay or a switch, a command value such as a position, a speed, or a torque imparted to a servo driver by a PLC, a variable value used for an arithmetic by the PLC, and the like.

As a device that collects such state values, an input relay, various sensors, and the like are assumed. The field device group 10 further includes a device that exerts some kind of action on a field on the basis of a command value (hereinafter also referred to as an "output value") which is generated by the control device 100. As a device that exerts some kind of action on such a field, an output relay, a contactor, a servo driver, a servo motor, and any other actuators are assumed. The field device group 10 exchanges data including the input value and the output value with the control device 100 through the field bus 2.

The configuration example shown in FIG. 2, the field device group 10 includes a remote input/output (IO) device 12, a relay group 14, an image sensor 18, a camera 20, a servo driver 22, and a servo motor 24.

The remote IO device 12 includes a communication unit that performs communication through the field bus 2 and an input and output unit (hereinafter also referred to as an "IO unit") for collecting an input value and outputting an output value. The input value and the output value are exchanged between the control device 100 and the field through such an IO unit. FIG. 2 shows an example in which a digital signal is exchanged as an input value and an output value through the relay group 14.

The IO unit may be connected directly to the field bus. FIG. 2 shows an example in which an IO unit 16 is connected directly to the field bus 2.

The image sensor 18 performs an image measurement process such as pattern matching on image data captured by the camera 20, and transmits the processing result to the control device 100.

The servo driver 22 drives the servo motor 24 in accordance with an output value (such as, for example, a position command) from the control device 100.

The program development device 200 provides a development environment for a user program which is executed by the control device 100. A user operates the program development device 200 to create a user program which is executed by the control device 100. Specifically, the program development device 200 provides a development environment (such as a program creation editing tool, a parser, or a compiler) for a user program which is executed by the control device 100, a function for determining a control device 100 and setting parameters (configurations) of various devices connected to the control device 100, a function of transmitting the created user program to the control device 100, a function of correcting and changing a user program executed on the control device 100 online, and the like.

C. Hardware Configuration Example

Next, hardware configuration examples of the control device 100 and the program development device 200 that constitute the control system 1 according to the present embodiment will be described.

(c1: Hardware Configuration Example of the Control Device 100)

Figure 3:
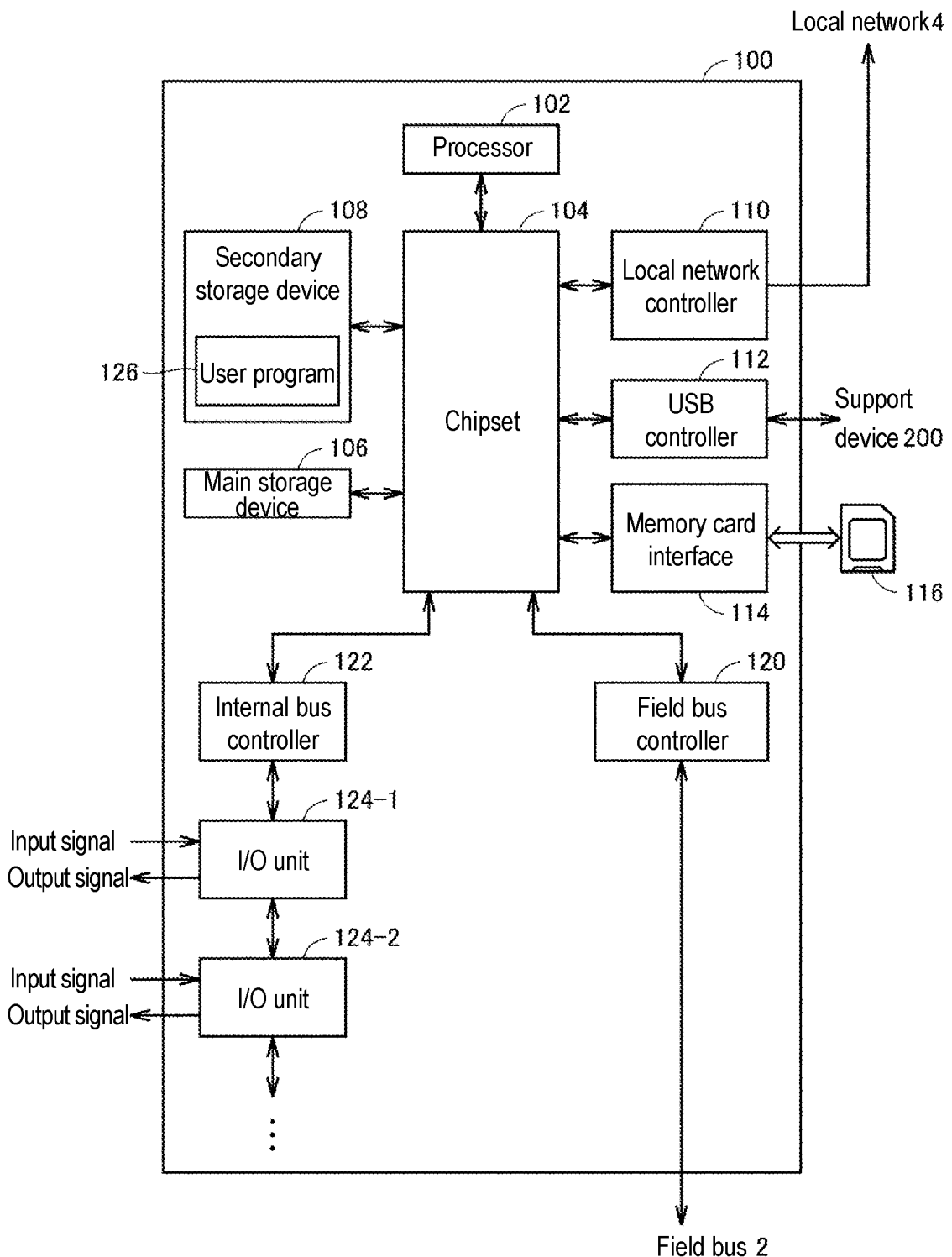
FIG. 3 is a block diagram illustrating a hardware configuration example of a control device that constitutes the control system according to the present embodiment.

FIG. 3 is a block diagram illustrating a hardware configuration example of the control device 100 that constitutes the control system 1 according to the present embodiment. Referring to FIG. 3, the control device 100 includes a processor 102 such as a central processing unit (CPU) or a micro-processing unit (MPU), a chipset 104, a main storage device 106, a secondary storage device 108, a local network controller 110, an universal serial bus (USB) controller 112, a memory card interface 114, a field bus controller 120, an internal bus controller 122, and IO units 124-1, 124-2, . . . .

The processor 102 reads out various programs stored in the secondary storage device 108, and develops and executes the programs on the main storage device 106 to thereby realize control according to a control target and various processes to be described later. The chipset 104 realizes processing as the entire control device 100 by controlling each component together with the processor 102.

The secondary storage device 108 stores an executable user program 126 (equivalent to a control program) created by the program development device 200 in addition to a system program (not shown).

The local network controller 110 controls exchange of data with another device through the local network 4. The USB controller 112 controls exchange of data with the program development device 200 through USB connection.

The memory card interface 114 is configured to be capable of attaching and detaching a memory card 116, and can write data to the memory card 116 and read out various types of data (such as a user program or trace data) from the memory card 116.

The field bus controller 120 controls exchange of data with another device through the field bus 2. The internal bus controller 122 is an interface that exchanges data with the IO units 124-1, 124-2, . . . which are mounted in the control device 100.

FIG. 3 shows a configuration example in which necessary functions are provided by the processor 102 executing a program code, but some or all of these provided functions may be implemented using a dedicated hardware circuit (such as, for example, an application specific integrated circuit (ASIC) or a field-programmable gate array (FPGA)). Alternatively, a main part of the control device 100 may be realized using hardware according to general-purpose architecture (for example, an industrial personal computer based on a general-purpose personal computer).

(c2: Hardware Configuration Example of Program Development Device 200)

Figure 4:
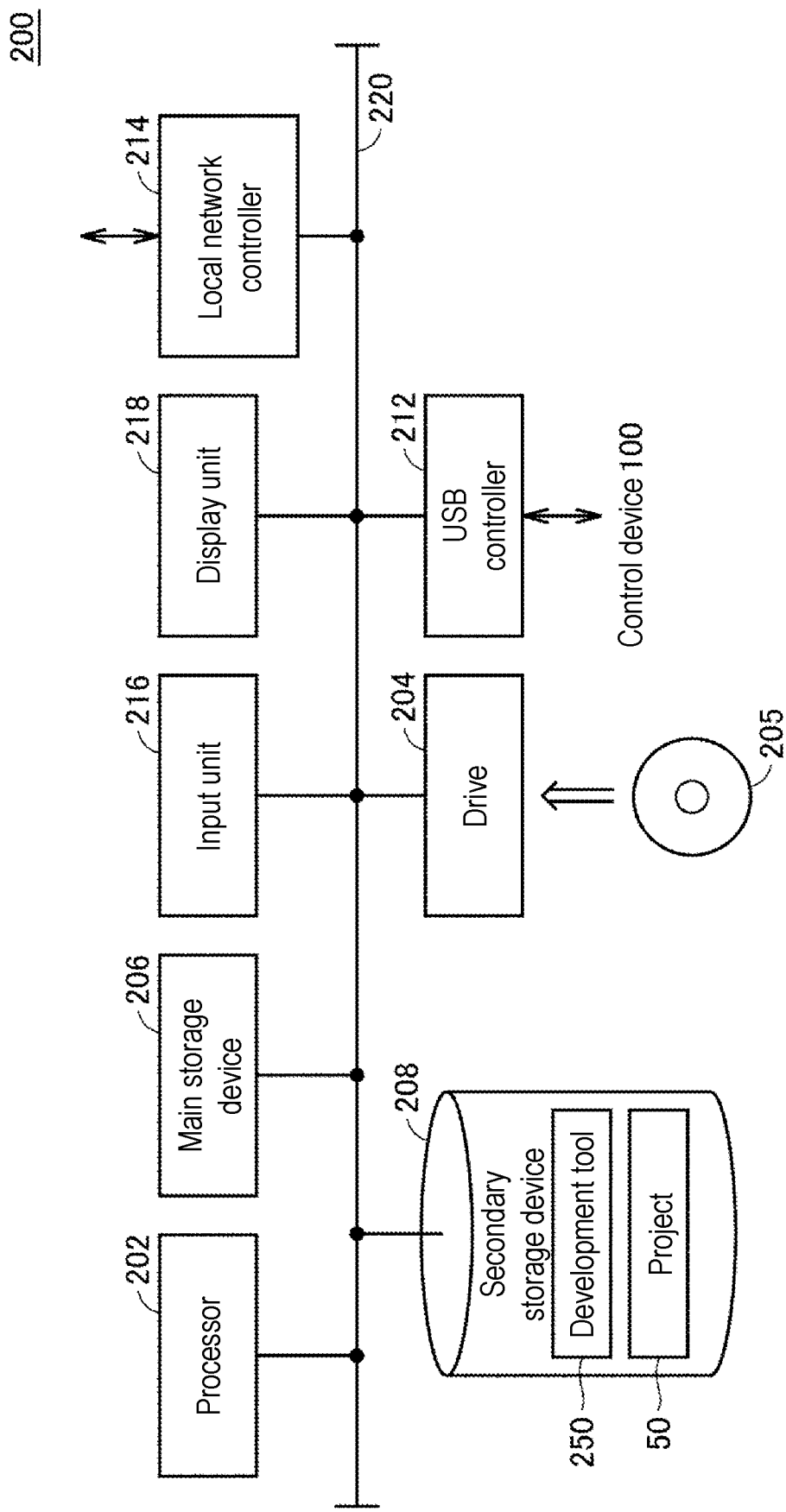
FIG. 4 is a block diagram illustrating a hardware configuration example of a program development device that constitutes the control system according to the present embodiment.

FIG. 4 is a block diagram illustrating a hardware configuration example of the program development device 200 that constitutes the control system 1 according to the present embodiment. As an example, the program development device 200 may be realized by executing a program using hardware (for example, a general-purpose personal computer) according to a general-purpose architecture.

Referring to FIG. 4, the program development device 200 includes a processor 202 such as a CPU or an MPU, a drive 204, a main storage device 206, a secondary storage device 208, a USB controller 212, a local network controller 214, an input unit 216, and a display unit 218. These components are connected to each other through a bus 220.

The processor 202 reads out various programs stored in the secondary storage device 208, and develops and executes the programs on the main storage device 206 to thereby realize various processes to be described later.

The secondary storage device 208 is constituted by, for example, a hard disk drive (HDD), a solid state drive (SSD), or the like. The secondary storage device 208 stores a development tool 250 for realizing various functions as will be described later. The secondary storage device 208 may store an OS and other necessary system programs. The secondary storage device 208 holds the project 50 including one or a plurality of program modules. The details of the project 50 and the program modules included in the project 50 will be described later.

The drive 204 can write data to a storage medium 205 and read out various types of data (a user program and various types of data) from the storage medium 205. The storage medium 205 includes, for example, the storage medium 205 (an optical storage medium such as, for example, a digital versatile disc (DVD)) that non-transiently stores a computer readable program.

The development tool 250 which is executed by the program development device 200 may be installed through the computer readable storage medium 205, or may be installed in the form of downloading the development tool from a server device or the like on a network. In addition, functions which are provided by the program development device 200 according to the present embodiment may be realized in the form of using some of modules which are provided by an OS.

The USB controller 212 controls exchange of data with the control device 100 through USB connection. The local network controller 214 controls exchange of data with another device through any network.

The input unit 216 is constituted by a keyboard, a mouse, or the like, and accepts a user's operation. The display unit 218 is constituted by a display, various indicators, or the like, and outputs processing results or the like from the processor 202. A printer may be connected to the program development device 200.

FIG. 4 shows a configuration example in which necessary functions are provided by the processor 202 executing a program code, but some or all of these provided functions may be implemented using a dedicated hardware circuit (such as, for example, an ASIC or an FPGA).

D. Modularized Programming

Next, modularized programming according to the present embodiment will be outlined.

(d1: Project Configuration)

Figure 5:
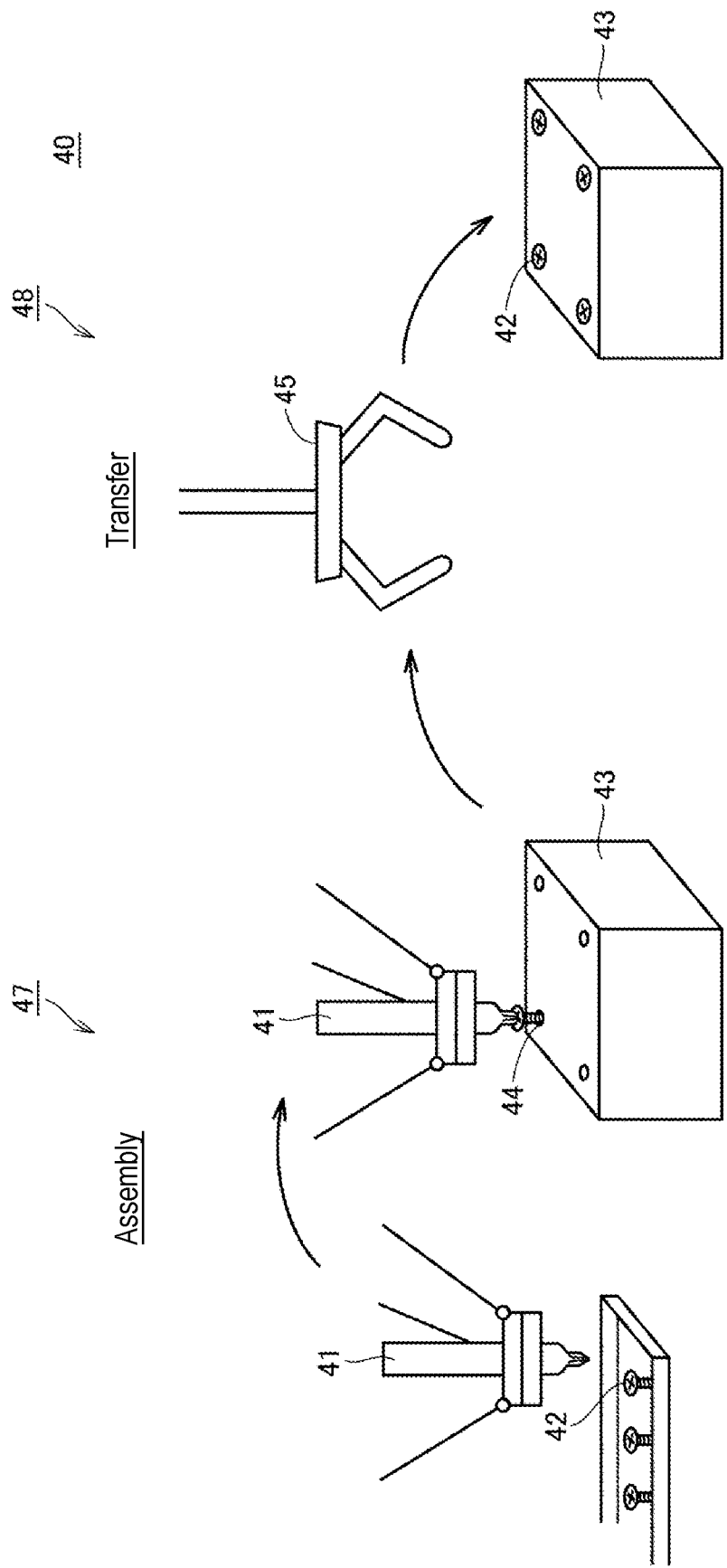
FIG. 5 is a diagram illustrating an example of equipment for explaining modularized programming according to the present embodiment.

FIG. 5 is a diagram illustrating an example of equipment for explaining modularized programming according to the present embodiment. FIG. 5 shows an example of assembly equipment 40 that assembles screws 42 to a workpiece 43. The assembly equipment 40 includes an assembly process 47 and a transfer process 48.

In the assembly process 47, a robot 41 picks (for example, adsorbs) the screw 42, moves the screw to the workpiece 43, and then assembles the screw 42 into a screw hole 44 of the workpiece 43.

In the transfer process 48, a robot 45 picks (for example, grasps) the workpiece 43 after assembling the screws 42, moves the workpiece to a predetermined position, and then places the picked workpiece 43. In this way, the assembly equipment 40 includes the assembly process 47 and the transfer process 48 of controlling the robots 41 and 45, respectively.

Figure 6:
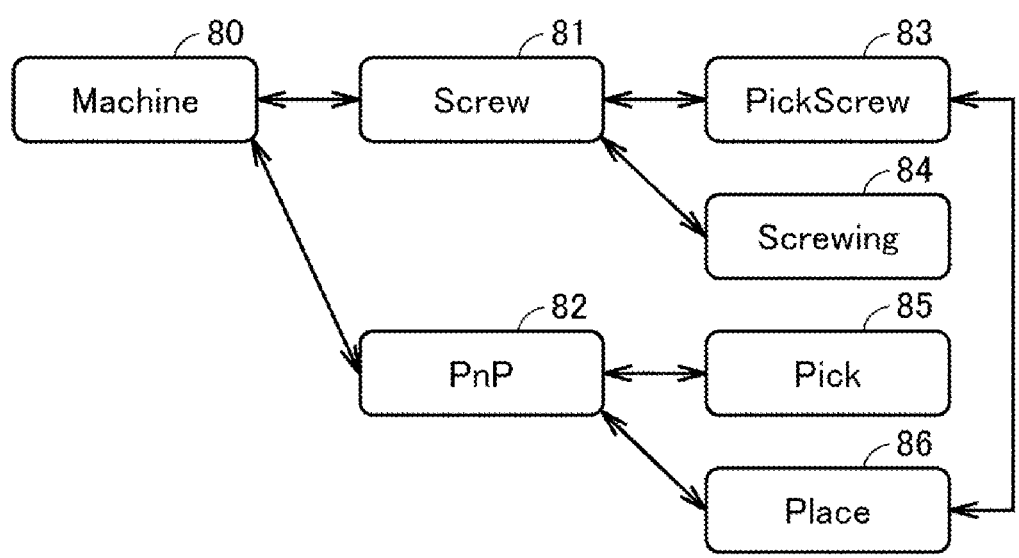
FIG. 6 is a diagram illustrating an example of modularized programming for realizing the assembly equipment shown in FIG. 5.

FIG. 6 is a diagram illustrating an example of modularized programming for realizing the assembly equipment 40 shown in FIG. 5. Referring to FIG. 6, the project 50 created by modularized programming includes an assembly equipment module (Machine) 80 for controlling the entire assembly equipment 40. The assembly equipment module 80 calls an assembly module (Screw) 81 and a transfer module (PnP) 82 corresponding to the assembly process 47 and the transfer process 48, respectively. The assembly module 81 and the transfer module 82 are directed to control corresponding devices and are also referred to as device modules.

In addition, a calling relationship between modules as described above is also referred to as a "parent-child relationship" or the like. A child module called from a parent module is referred to as "POU (Program Organization Units)." That is, any child module having a parent module can be a POU.

Further, the assembly module 81 calls a screw pick module (PickScrew) 83 and a screw mounting module (Screwing) 84 for controlling the behavior of the robot 41 and related equipment in the assembly process 47.

Similarly, the transfer module 82 calls a pick module (Pick) 85 and a place module (Place) 86 for controlling the behavior of the robot 45 and related equipment in the transfer process 48.

Further, the screw pick module 83 which is in charge of the first processing of the process and the place module 86 which is in charge of the final processing of the process cooperate with each other to control the processing cycle of the entire assembly equipment 40.

In the modularized programming according to the present embodiment, the purpose is to improve the design efficiency and reusability of a program by making parts in units of equipment, in units of devices included in the equipment, or in units of processes included in the device.

Figure 7:
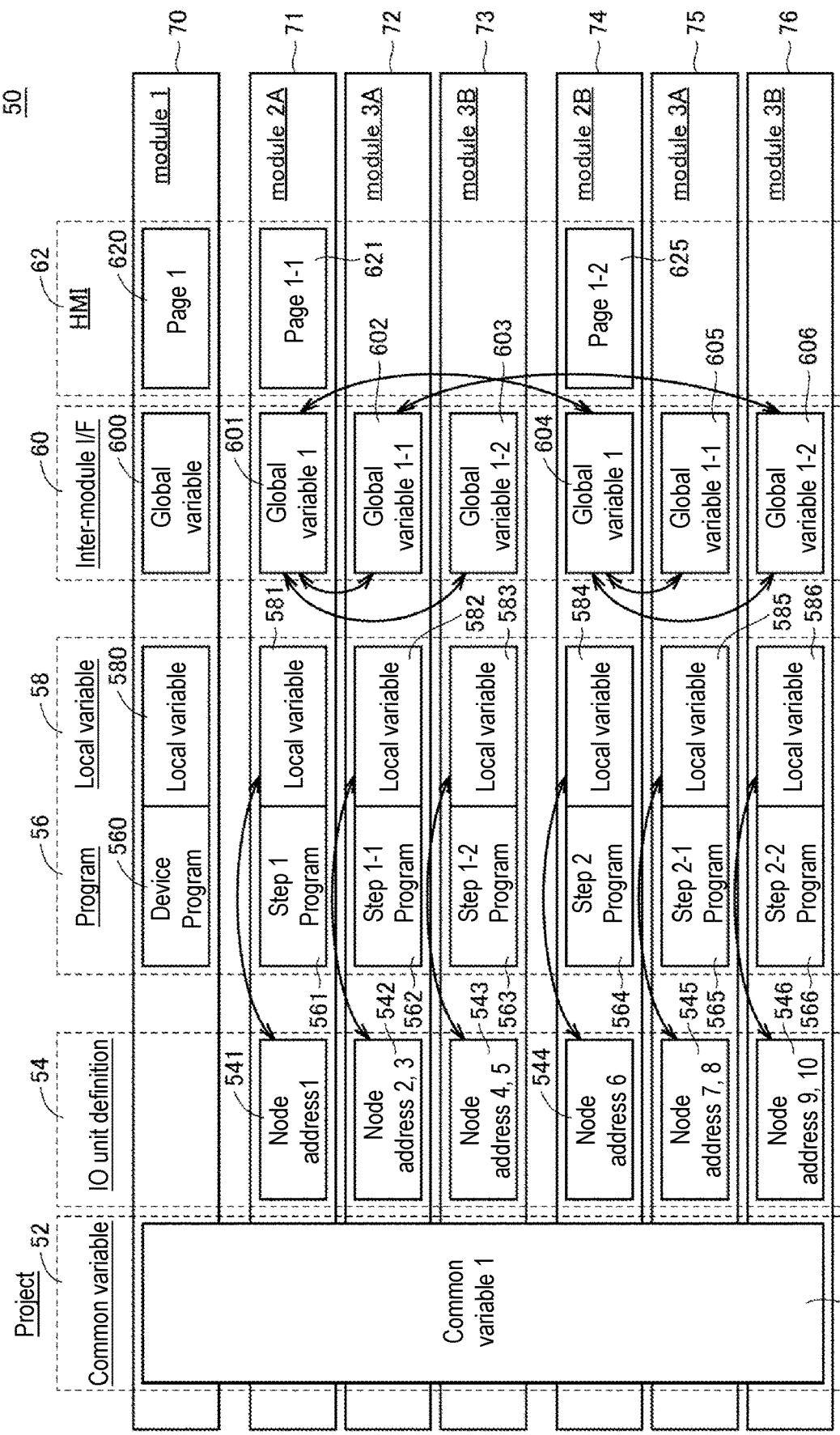
FIG. 7 is a schematic diagram illustrating an example of a data structure of a project 50 which is created in modularized programming according to the present embodiment.

FIG. 7 is a schematic diagram illustrating an example of a data structure of the project 50 which is created in modularized programming according to the present embodiment. Referring to FIG. 7, the project 50 includes one or a plurality of program modules 70 to 76. Each of the program modules includes the common variable 52, an IO unit definition 54, a program 56, the local variable 58, the inter-module I/F 60, and a human machine interface (HMI) 62 as elements. That is, each of the program modules is a module obtained by packaging not only a program but also elements required for executing the program.

For example, the program modules 70 to 76 shown in FIG. 7 correspond to the assembly equipment module 80, the assembly module 81, the transfer module 82, the screw pick module 83, the screw mounting module 84, the pick module 85, and the place module 86, respectively.

The common variable 52 defines a variable that can be referenced among all program modules included in the project 50. In the example shown in FIG. 7, the common variable 520 is defined as the common variable 52. The common variable 520 is a variable defined in the project 50. For example, the common variable 520 includes a variable indicating an emergency stop, a variable indicating an abnormality, and the like. An example in which a variable commonly referenced in each process such as "Estop" indicating an emergency stop is set as the common variable 520 is shown below. However, without being limited to this, "Battery Low," "Warning," "EmergencyStop," "CycleTimeOver" (cycle time over abnormality), and the like may be set as the common variable 520.

The IO unit definition 54 defines an IO unit associated with each program module. That is, each program module can include the definition of the associated IO unit (the IO unit definition 54). In the example shown in FIG. 7, for the program modules 71 to 76, node addresses 541 to 546 indicating addresses on a network allocated to an IO unit which is a connection destination are defined respectively as the IO unit definition 54.

The program 56 means a program which is a main portion of each program module. In the example shown in FIG. 7, programs 560 to 566 are created for the program modules 70 to 76, respectively.

The local variable 58 defines a variable referenced in the corresponding program 56 (that is, a variable which is not assumed to be referenced from a program 56 other than the corresponding program 56). In the example shown in FIG. 7, local variables 580 to 586 are defined for the program modules 70 to 76, respectively. The local variable is also used as an interface variable of data with a corresponding IO unit.

The inter-module I/F 60 defines an interface variable which is a variable that can be referenced among the plurality of program modules included in the project 50. Variables that can be referenced among all program modules may be defined in the inter-module I/F 60, but such variables are preferably defined as the common variable 52, and thus basically, variables which are referenced only among some program modules included in the project 50 are defined. In the example shown in FIG. 7, for the program modules 70 to 76, global variables 600 to 606 are defined respectively as the inter-module I/F 60. In the example of the assembly equipment 40 shown in FIG. 5, a reference relationship (dependency) as shown in FIG. 7 may exist between the global variables 600 to 606.

The HMI 62 means a screen application for accepting a process result of a corresponding program or a user's operation of the program. In the example shown in FIG. 7, pages 620, 621, and 625 are created for the program modules 70, 71, and 74, respectively.

Figure 8:
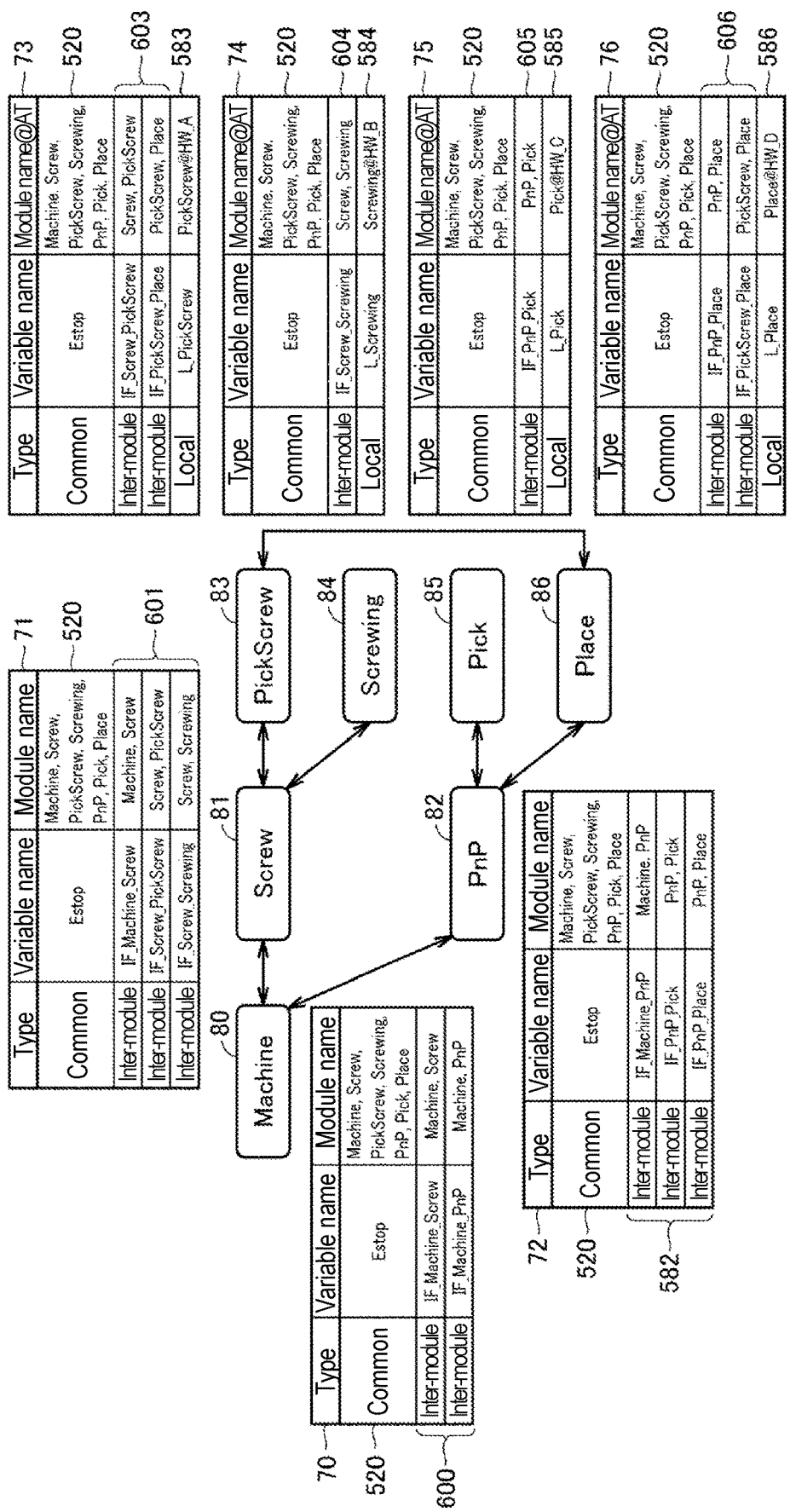
FIG. 8 is a schematic diagram illustrating a specific design example of modularized programming shown in FIGS. 6 and 7.

FIG. 8 is a schematic diagram illustrating a specific design example of modularized programming shown in FIGS. 6 and 7. Referring to FIG. 8, in the project 50, the common variable 520, the global variables 600 to 606 as the inter-module I/F 60, and the local variables 583 to 586 are defined in the program modules 70 to 76.

(d2: Export and Import)

In the modularized programming according to the present embodiment, reuse is possible in units of program modules. In such reuse, "export/import" or "copy & paste" of a target program module is performed. That is, the program development device 200 has an extraction function of exporting one or a plurality of program modules from the project, and has an update function of importing one or a plurality of program modules into the project. These functions may be realized by the processor 202 of the program development device 200 executing the development tool 250.

Figure 9:
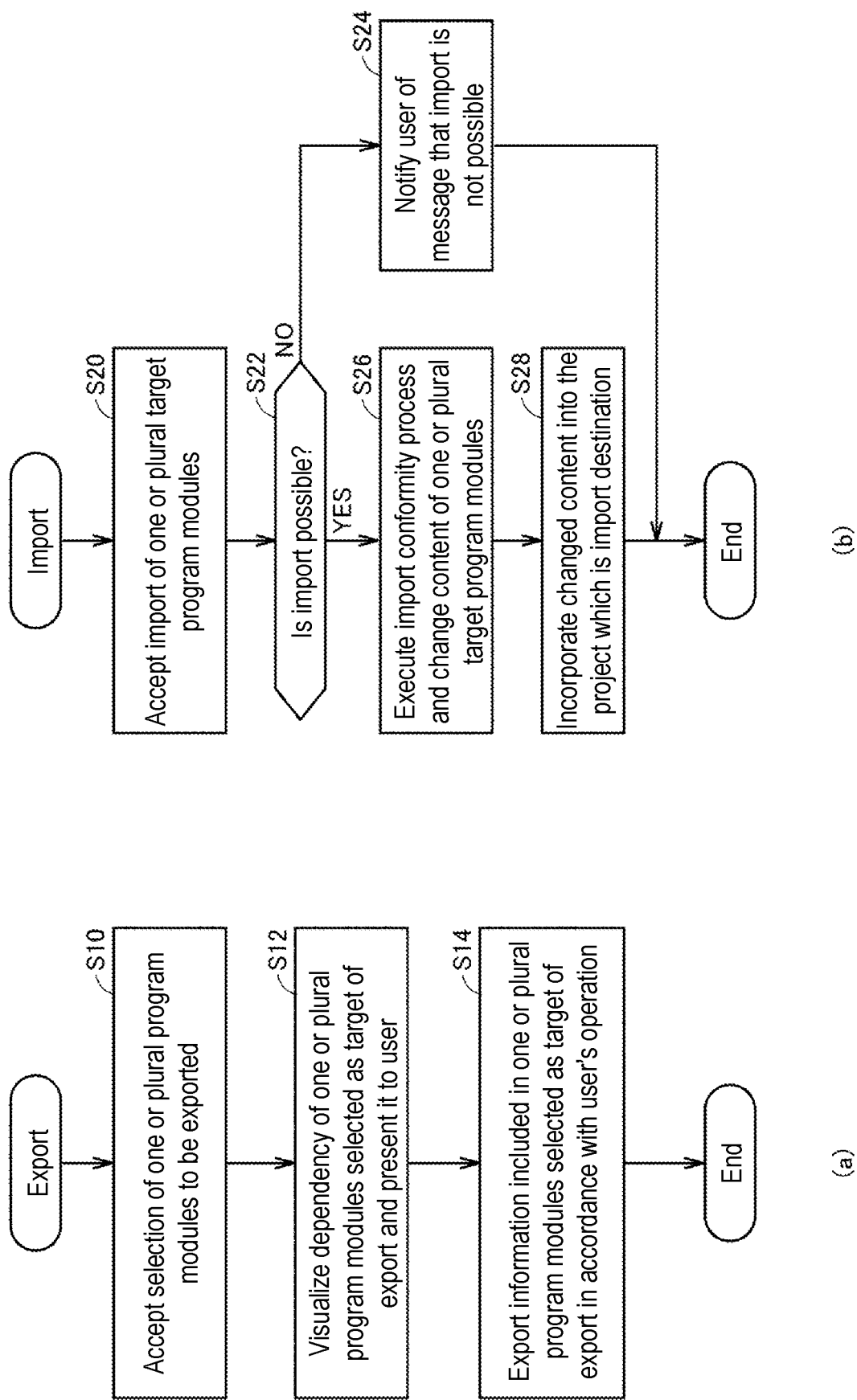
FIG. 9 is a flowchart illustrating a processing procedure of export and import in modularized programming according to the present embodiment.

FIG. 9 is a flowchart illustrating a processing procedure of export and import in modularized programming according to the present embodiment. Each step shown in FIG. 9 is typically realized by the processor 202 of the program development device 200 executing the development tool 250.

In the export process of the program module shown in (a) of FIG. 9, a user selects one or a plurality of program modules to be exported (step S10). The program development device 200 visualizes the dependency of one or a plurality of program modules selected as the target of export and presents it to the user (step S12). For example, the dependency or the like of the program module as shown in FIG. 6 is presented.

Finally, the program development device 200 exports information included in one or a plurality of program modules selected as the target of export in accordance with the user's operation (step S14). The exported information includes a program (user program), a function, a function block, a variable definition, and the like. The process ends.

In the import process of the program module as shown in (b) of FIG. 9, the user imports one or a plurality of target program modules (step S20). The program development device 200 determines whether import is possible on the basis of the IO unit definition 54 of one or a plurality of imported program modules (step S22).

In a case where it is determined that the import is not possible (NO in step S22), the program development device 200 notifies the user of a message that the import is not possible (step S24). The process ends.

In a case where it is determined that the import is possible (YES in step S22), the program development device 200 executes an import conformity process, changes the content of one or a plurality of target program modules (step S26), and then incorporates it into the project which is an import destination (step S28). The process ends.

FIGS. 10 and 11 are diagrams illustrating a data example of a program module exported in modularized programming according to the present embodiment. Referring to FIG. 10, exported project data 160 includes element data 166 in association with a module name 162 and an identifier 164 for specifying each piece of data. Further, an identifier 168 indicating whether the data is shared between modules is also associated.

FIG. 11 shows a portion of the definition of the global variable included in the exported project data 160. The definition of the global variable includes the definitions of a variable name 170 and a module name 172 to which it belongs.

E. Import

Next, an import and import conformity process in modularized programming according to the present embodiment will be described.

(e1: Addition (Import) in Units of Program Modules)

As shown in FIG. 7, in the modularized programming according to the present embodiment, each program module has a program and configuration information (for example, a node address included in the IO unit definition 54) of one or a plurality of IO units (devices) in a cross-sectional manner.

In a case where a program module is exported, configuration information (such as, for example, device type, model, or version information) of an IO unit is held. In a case where a program module is imported, the user may determine which IO unit to correspond to by referencing the configuration information of the IO unit defined in the project which is an import destination (see FIG. 15 or the like to be described later).

(1) Case of Control Device 100

It is determined whether the imported module name is overlapped, and in a case where there is an overlap, the module name is changed. In addition, it is determined whether the imported IO unit definition 54 is overlapped, and in a case where there is an overlap, the IO unit definition 54 is set.

Data types, axes, axis groups, and the like will be exported as they are, but in a case where there is an overlapped global variable name, the global variable name is changed.

Further, a reference relationship for the global variable of the HMI is also appropriately updated.

(2) Case of HMI

For the HMI, device types, pages, resources, events, global subroutines, global variables, and the like are exported as they are. Meanwhile, the name (controller name) of the control device 100 which is a reference destination is appropriately updated.

Hereinafter, a case where a device module is imported with the assembly equipment module 80 as a parent module for the project 50 shown in FIG. 8 will be exemplified.

(e2: First Import of Device Module)

Figure 12:
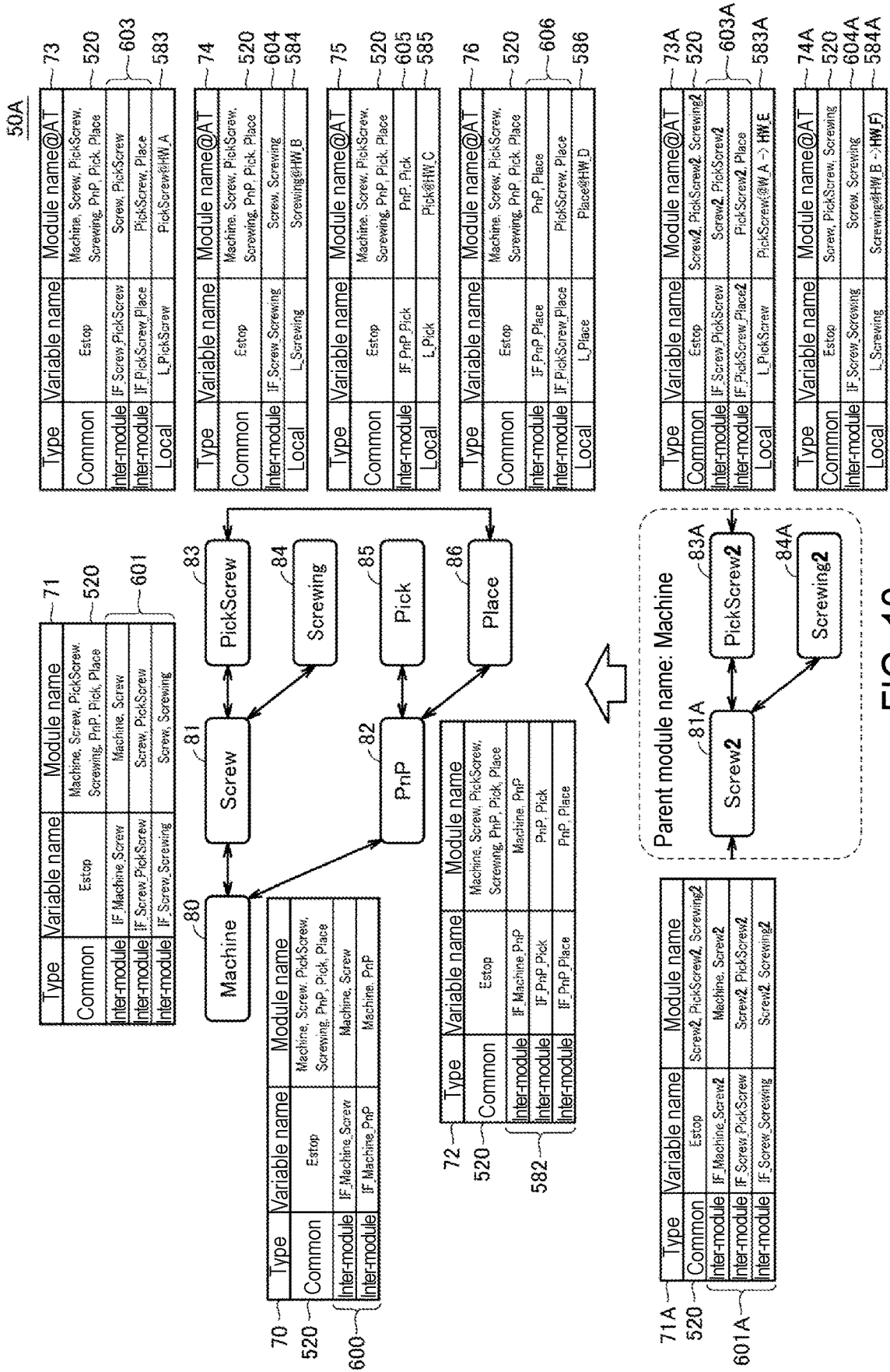
FIG. 12 is a diagram illustrating an example of a procedure in a case where the same device module is imported into the project shown in FIG. 8.

FIG. 12 is a diagram illustrating an example of a procedure in a case where the same device module is imported into the project 50 shown in FIG. 8. More specifically, FIG. 12 shows an example in which the same module group (an assembly module 81A, a screw pick module 83A, and a screw mounting module 84A) as the screw pick module 83 and the screw mounting module 84 called from the assembly module 81 and the assembly module 81 is imported.

In this way, import may be performed in units of a plurality of program modules having a calling relationship.

In importing such a module group, the following processes (1) to (4) are executed.

(1) Determination of Whether Imported IO Unit Definition 54 is Overlapped

Since the IO unit definition 54 cannot be referenced overlappingly in a plurality of program modules, it is determined whether the IO unit definition 54 of the imported module is overlapped. Specifically, it is determined whether a node address in the IO unit definition 54 is overlapped.

In this case, it is necessary to perform a change to the node address of an IO unit used by the imported module. That is, the node address included in the IO unit definition 54 is set to a correct value (see a local variable 583A of a program module 73A and 584A of a program module 74A).

(2) Determination of Whether Imported Device Module Name is Overlapped

In a case where the module name of the imported device module overlaps the existing module name, it cannot be appropriately referenced from the equipment module (the assembly equipment module 80), and thus it is necessary to change the module name of the imported device module (the assembly module 81A). The change of the module name may be arbitrarily input by a user, and may be performed in accordance with a naming rule determined in advance.

In the example shown in FIG. 12, the module name of the assembly module 81A has been changed the module name "Screw" of the assembly module 81 to "Screw2." Along with this change of the module name, a module name defined as a reference source of a variable is also changed (column of the module names of program modules 71A, 73A, and 74A).

(3) Determination of Whether Imported Child Module Name is Overlapped

In a case where the imported child module name (called module) overlaps the existing module name, it cannot be appropriately referenced between modules, and thus it is necessary to change the module name of the imported child module (the screw pick module 83A and the screw mounting module 84A). The change of the module name may be arbitrarily input by a user, and may be performed in accordance with a naming rule determined in advance.

In the example shown in FIG. 12, the module name of the screw pick module 83A has been changed from the module name "PickScrew" of the screw pick module 83 to "PickScrew2." Similarly, the module name of the screw mounting module 84A has been changed from the module name "Screwing" of the screw mounting module 84 to "Screwing2"

(4) Determination of Whether Variable Name Referenced by Program Module is Overlapped Since the common variable defined in the common variable 52 is commonly referenced among a plurality of program modules, no change is necessary. In this way, the common variable defined in the existing project 50 is used as it is (that is, it is not imported).

On the other hand, since the global variable (interface variable) defined in the inter-module I/F 60 is referenced between program modules, it is necessary to adjust the global variable so that it is not overlapped in the project. In a case where there is an overlap in the project, the variable name is changed. The change of the variable name may be arbitrarily input by a user, and may be performed in accordance with a naming rule determined in advance.

In the example shown in FIG. 12, in a global variable 601A of the program module 71A, the variable name of the global variable referenced between the assembly equipment module 80 and the assembly module 81A has been changed from "IF_Machine_Screw" to "IF_Machine_Screw2." Similarly, in a global variable 603A of the program module 73A, the variable name of the global variable referenced between the screw pick module 83A and the place module 86 has been changed from "IF_PickScrew_Place" to "IF_PickScrew_Place2."

It is possible to easily reuse a portion of the modularized project by applying the four processes as described above. Meanwhile, the common variable 520 referenced in the imported program module is maintained as it is (that is, the definition or the like is not changed).

(e3: Second Import of Module)

Figure 13:
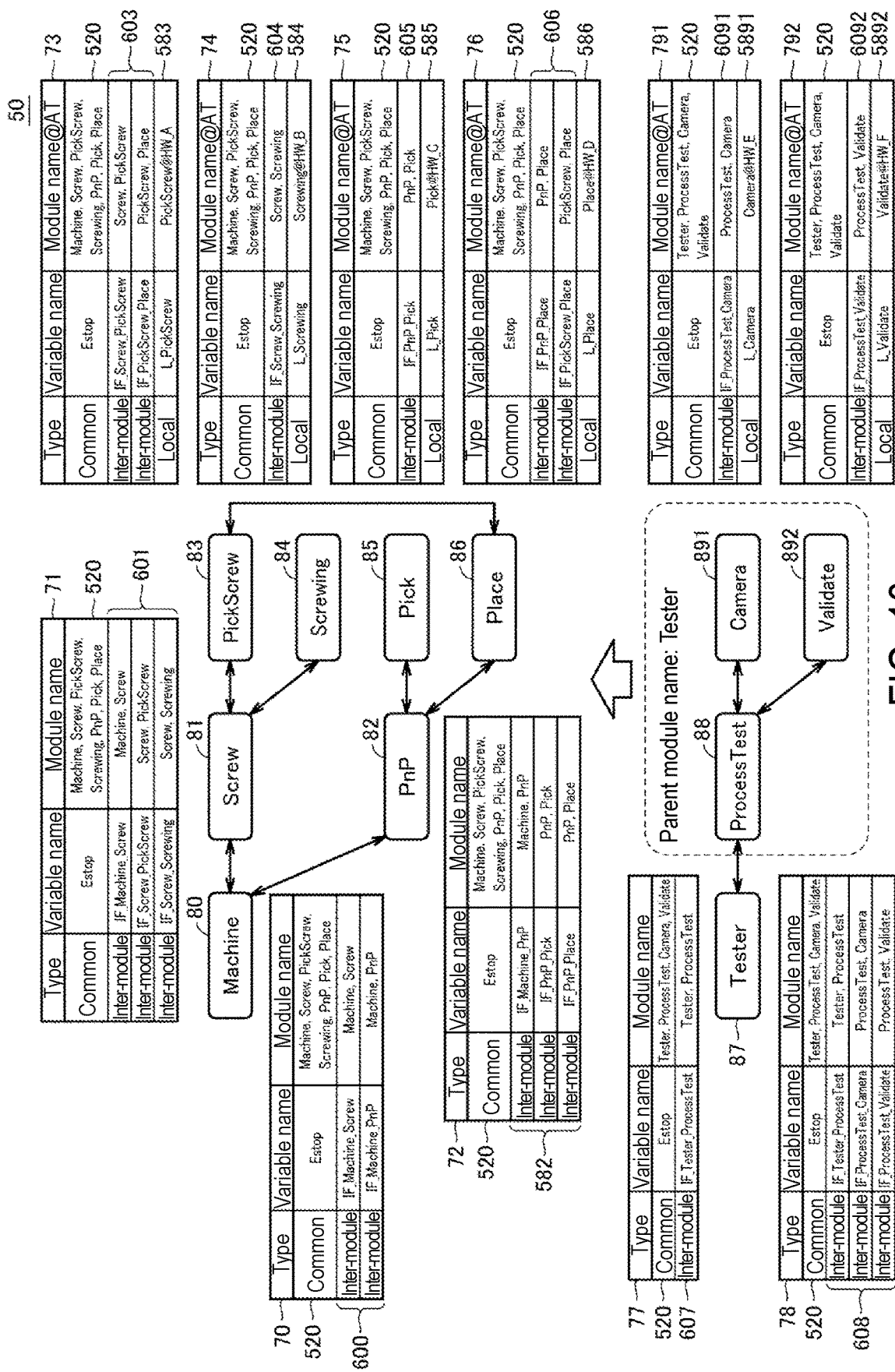
FIG. 13 is a diagram illustrating an example of a procedure in a case where a new device module is imported into the project shown in FIG. 8.

FIG. 13 is a diagram illustrating an example of a procedure in a case where a new device module is imported into the project 50 shown in FIG. 8. More specifically, FIG. 13 shows an example in which a test module (Tester) 87 for controlling the entire test equipment is newly imported.

The test module 87 includes a process test module (ProcessTest) 88 as a device module called from the test module 87. The process test module 88 calls an imaging module (Camera) 891 that controls an imaging process and an evaluation module (Validate) 892 that evaluates a captured image.

In this way, import may be performed in units of a plurality of program modules having a calling relationship.

In importing such a module group, the following processes (1) to (4) are executed similarly to the import of the module as described above.

(1) Determination of Whether Imported IO Unit Definition 54 is Overlapped

It is determined whether the IO unit definition 54 of the imported module is overlapped. In the example shown in FIG. 13, the IO unit definition 54 is not overlapped, and thus original the IO unit definition 54 is imported as it is.

(2) Determination of Whether Imported Device Module Name is Overlapped

Even in a case where a new device module is imported, it is determined that the module name of the existing device module is overlapped, but in the example shown in FIG. 13, the module name is not overlapped, and thus the original device module is imported as it is.

A program module 77 corresponding to the test module 87 includes the common variable 520 and a global variable 607.

(3) Determination of Whether Imported Child Module Name is Overlapped

It is determined whether the module name of the imported child module (the process test module 88, the imaging module 891, and the evaluation module 892) overlaps the existing module name. In the example shown in FIG. 13, the module name is not overlapped, and thus the original module name is imported as it is.

In the example shown in FIG. 13, a program module 78 corresponding to the process test module 88 includes the common variable 520 and a global variable 608. A program module 791 corresponding to the imaging module 891 includes the common variable 520, a global variable 6091, and a local variable 5891. A program module 792 corresponding to the evaluation module 892 includes the common variable 520, a global variable 6092, and a local variable 5892.

(4) Determination of Whether Variable Name Referenced by Program Module is Overlapped Since the common variable defined in the common variable 52 is commonly referenced among the plurality of program modules, no change is necessary.

In addition, the variable name of the global variable (interface variable) defined in the inter-module I/F 60 is changed as necessary so as not to be overlapped in the project. The change of the variable name may be arbitrarily input by a user, and may be performed in accordance with a naming rule determined in advance.

Meanwhile, since the local variable is used only in a corresponding program, it is not necessary to consider an overlap with other modules. In addition, the common variable 520 referenced in the imported program module is maintained as it is (that is, the definition or the like is not changed).

(e4: Processing Procedure of Import Conformity Process)

Next, the processing procedure of an import conformity process will be described.

Figure 14:
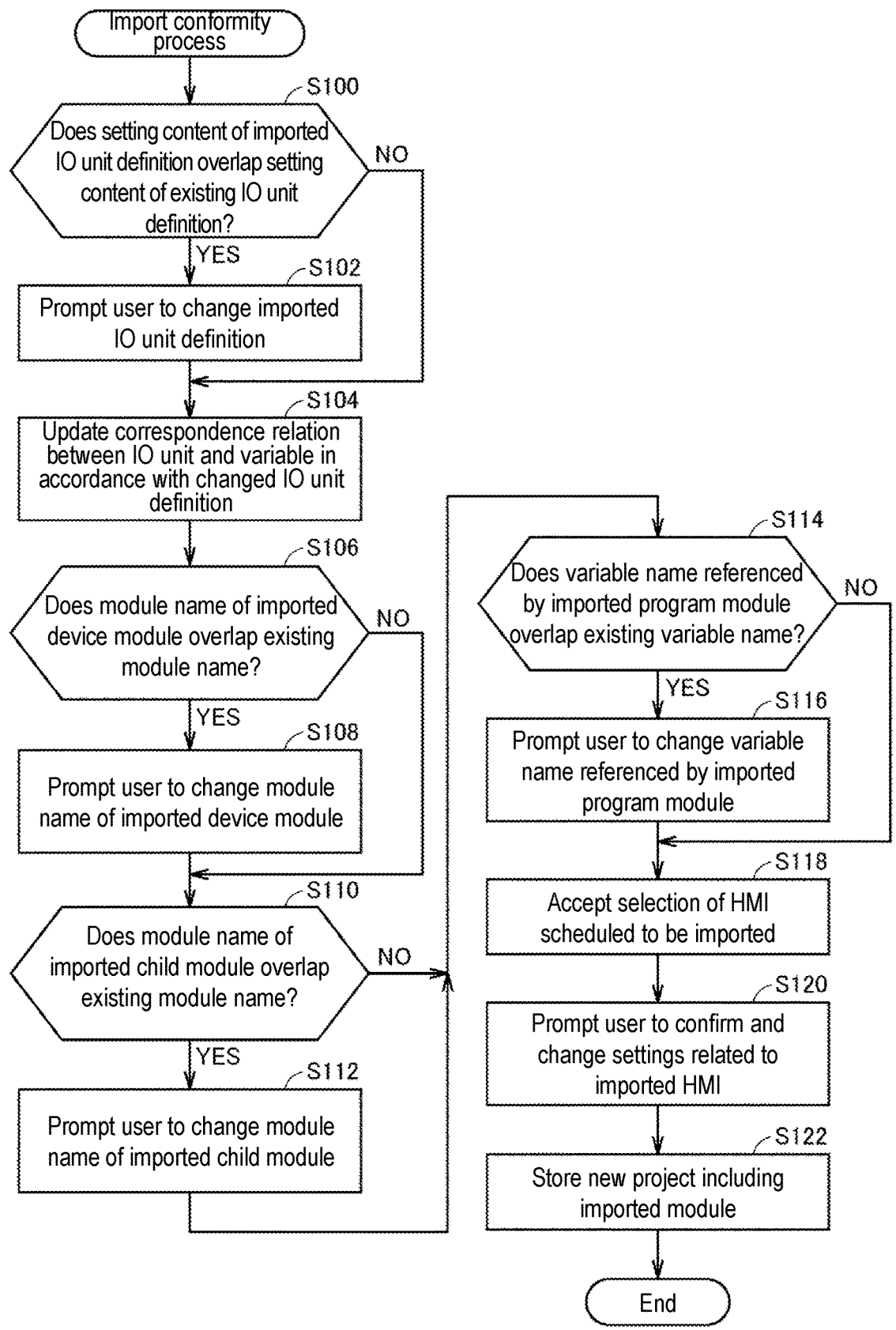
FIG. 14 is a flowchart illustrating a processing procedure of an import conformity process in modularized programming according to the present embodiment.

FIG. 14 is a flowchart illustrating a processing procedure of an import conformity process in modularized programming according to the present embodiment. The processing procedure shown in FIG. 14 is equivalent to the detailed content of step S26 of the processing procedure shown in FIG. 9. Each step shown in FIG. 14 is typically realized by the processor 202 of the program development device 200 executing the development tool 250.

Referring to FIG. 14, the program development device 200 determines whether the setting content of the imported IO unit definition 54 overlaps the setting content of the existing IO unit definition 54 (step S100).

In a case where the setting content of the imported IO unit definition 54 overlaps the setting content of the existing IO unit definition 54 (YES in step S100), the program development device 200 prompts a user to change the imported IO unit definition 54 (step S102).

Figure 15:
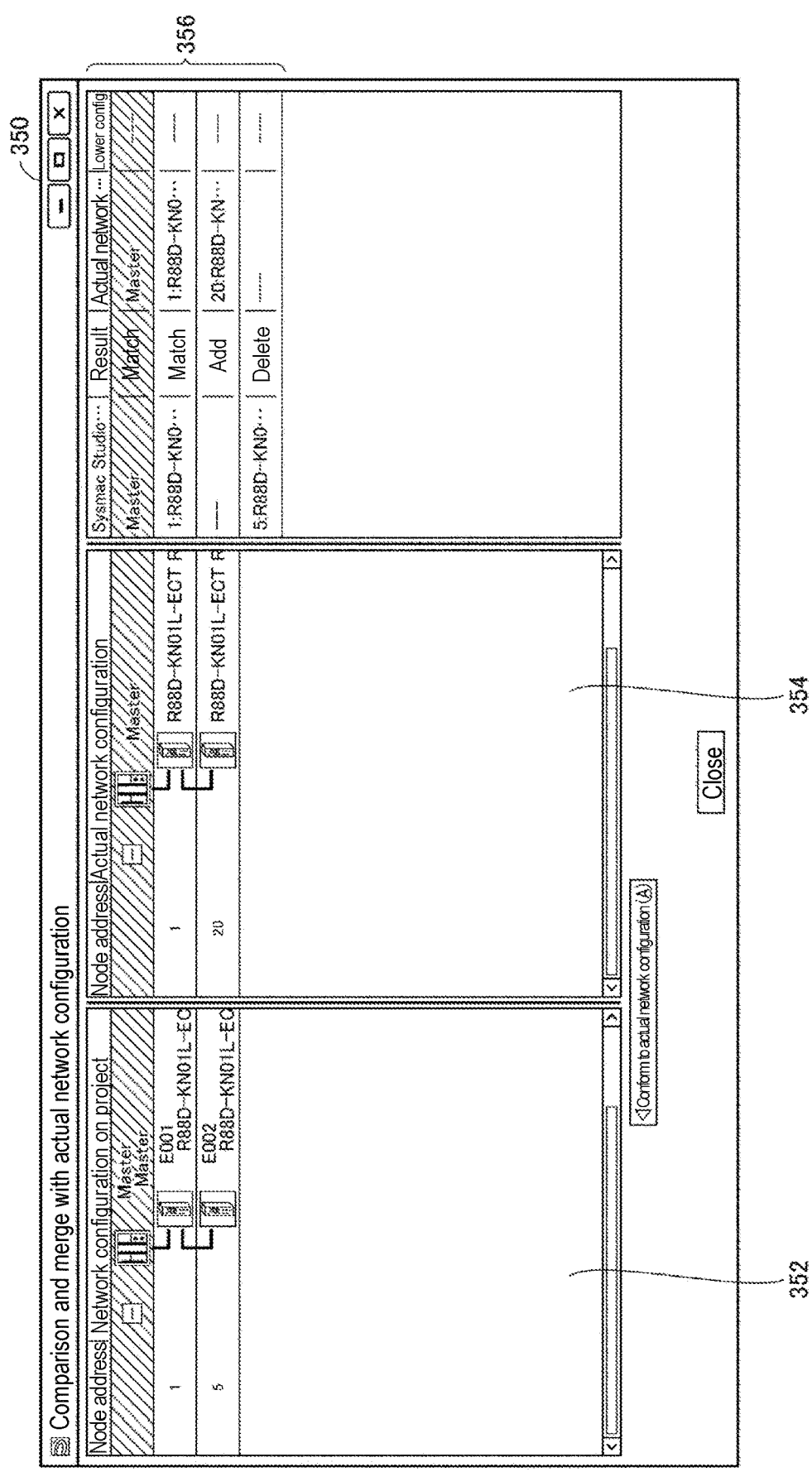
FIG. 15 is a diagram illustrating an example of a setting screen showing whether an IO unit definition 54 is overlapped in modularized programming according to the present embodiment.

FIG. 15 is a diagram illustrating an example of a setting screen showing whether the IO unit definition 54 in modularized programming according to the present embodiment is overlapped. In the setting screen 350 shown in FIG. 15, setting content 352 of the IO unit definition 54 included in the imported program module and setting content 354 of the IO unit definition 54 of the project which is an import destination are compared, and a comparison result 356 is displayed. The user appropriately changes the IO unit definition 54 with reference to the comparison result 356.

In this way, the IO unit definition 54 included in the imported program module overlaps the IO unit definition 54 included in any of the program modules of the project 50, the program development device 200 accepts a change of the overlapped IO unit definition 54. In a case where the IO unit definition 54 included in the imported program module is overlapped, the program development device 200 presents the overlapped IO unit definition 54 to the user (see FIG. 15).

Referring back to FIG. 14, in a case where the IO unit definition 54 is changed by the user, the program development device 200 updates a correspondence relation between the IO unit and the variable in accordance with the changed IO unit definition 54 (step S104).

In a case where the setting content of the imported IO unit definition 54 does not overlap the setting content of the existing IO unit definition 54 (NO in step S100), the processes of steps S102 and S104 are skipped.

Next, the program development device 200 determines whether the module name of the imported device module overlaps the existing module name (step S106).

In a case where the module name of the imported device module overlaps the existing module name (YES in step S106), the program development device 200 prompts the user to change the module name of the imported device module (step S108).

In a case where the module name of the imported device module does not overlap the existing module name (NO in step S106), the process of step S108 is skipped.

Next, the program development device 200 determines whether the module name of the imported child module overlaps the existing module name (step S110).

In a case where the module name of the imported child module overlaps the existing module name (YES in step S110), the program development device 200 prompts the user to change the module name of the imported child module (step S112).

Figure 16:
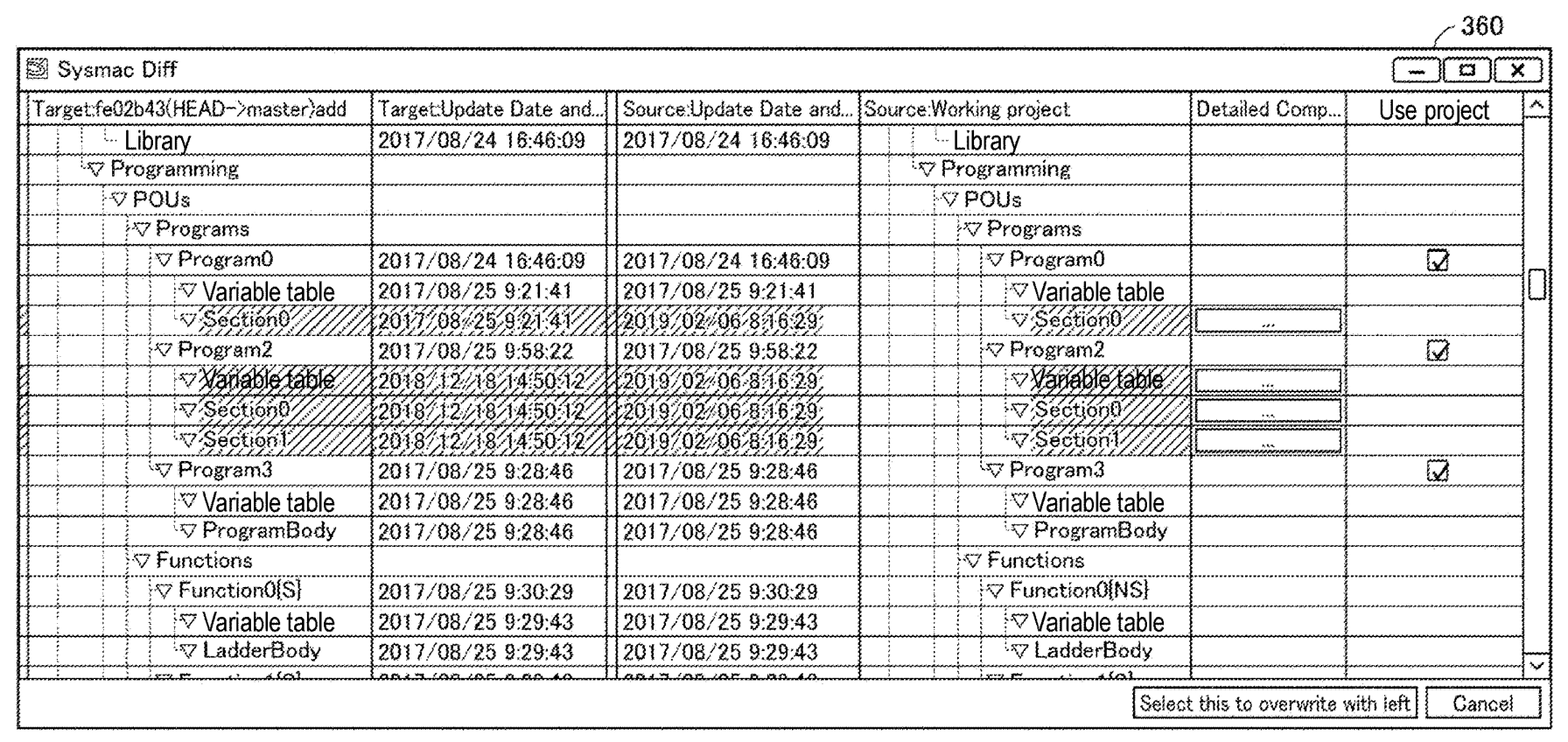

FIG. 16 is a diagram illustrating an example of a setting screen for selecting and changing an imported module in modularized programming according to the present embodiment. In a setting screen 360 shown in FIG. 16, those overlapping the module names of modules included in the existing project among the imported modules are highlighted. For example, a module having an overlapped module name is displayed in a different aspect from other modules.

The user can easily identify a module of which the module name has to be changed among program modules scheduled to be imported, and can change the module name as necessary. Meanwhile, the program development device 200 can also change the module name in accordance with a naming rule (the details thereof will be described later).

In this way, in a case where the name of a program included in the imported program module overlaps the name of a program included in any of the program modules of the project 50, the program development device 200 accepts a change of the overlapped name of the program. In a case where the name of the program included in the imported program module is overlapped, the program development device 200 presents the overlapped name of the program to the user (see FIG. 16).

Referring back to FIG. 14, in a case where the module name of the imported child module does not overlap the existing module name (NO in step S110), the process of step S112 is skipped.

Next, the program development device 200 determines whether the variable name referenced by the imported program module overlaps the existing variable name (step S114). In this case, the common variable 520 referenced in the imported program module is maintained as it is (that is, the definition or the like is not changed). Basically, it is determined that the variable name of only the global variable defined as the inter-module I/F 60 is overlapped.

In a case where the variable name referenced by the imported program module overlaps the existing variable name (YES in step S114), the program development device 200 prompts the user to change the variable name referenced by the imported program module (step S116).

FIG. 17 is a diagram illustrating an example of a setting screen for selecting and changing a variable name referenced by an imported program module in modularized programming according to the present embodiment. In a setting screen 370 shown in FIG. 17, the user selects and changes a variable name referenced by a program module scheduled to be imported. Meanwhile, the program development device 200 can also change a variable name in accordance with a naming rule (the details thereof will be described later).

In this way, in a case where the variable name of a global variable defined as the inter-module I/F 60 included in the imported program module overlaps the variable name of a global variable included in any of the program modules of the existing project, the program development device 200 accepts a change of the overlapped variable name. In a case where the variable name of the global variable included in the imported program module is overlapped, the program development device 200 presents the overlapped global variable to the user (see FIG. 17).

Referring back to FIG. 14, in a case where the variable name referenced by the imported program module does not overlap the existing variable name (NO in step S114), the process of step S116 is skipped.

Next, the program development device 200 accepts the user's selection of an HMI scheduled to be imported (step S118), and prompts the user to confirm and change settings related to the imported HMI (step S120).

Finally, the program development device 200 stores a new project including the imported module (step S122), and ends the process.

F. Import/Reuse of HMI

Next, a process of importing or reusing the HMI 62 included in the program module will be described. Since the HMI operates by being connected to one or a plurality of target control devices 100, it is necessary to appropriately set and change the control device 100 or the like which is a connection destination in a case where information of the HMI is reused. Hereinafter, an operation procedure or the like in a case where such an HMI is imported will be described.

Figure 18:
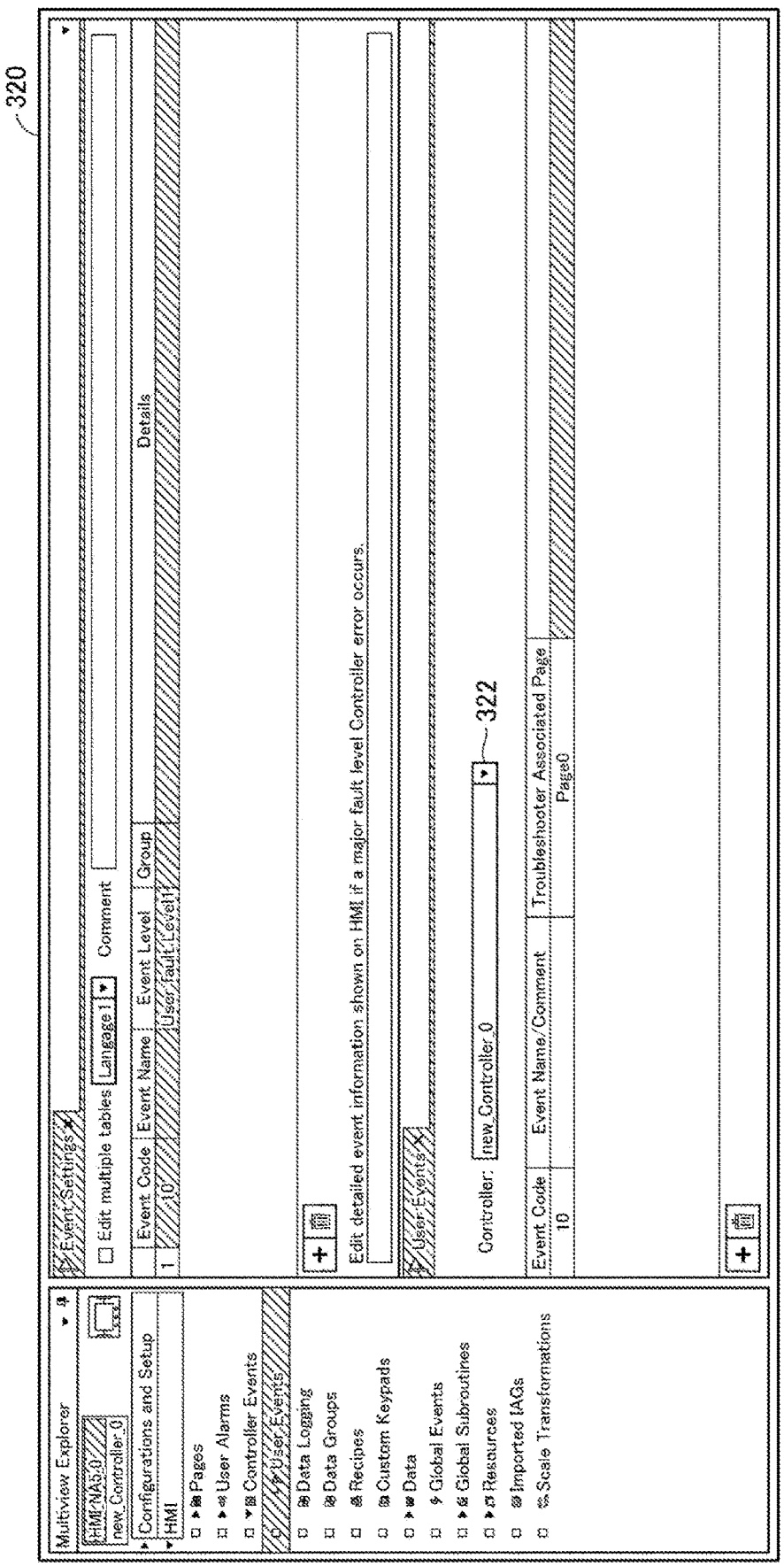
FIG. 18 is a diagram illustrating an example of a setting screen for explaining an operation procedure of associating an HMI with a control device 100 in modularized programming according to the present embodiment.

FIG. 18 is a diagram illustrating an example of a setting screen for explaining an operation procedure of associating an HMI with the control device 100 in modularized programming according to the present embodiment. Referring to FIG. 18, a setting screen 320 is a screen for setting an event which is a condition for the HMI to execute some kind of process.

The user operates a pulldown 322 on the setting screen 320 to select a control device 100 serving as a connection destination among the control devices 100 included in the project. An association is defined between the control device 100 and the HMI through this selection operation.

Figure 19:
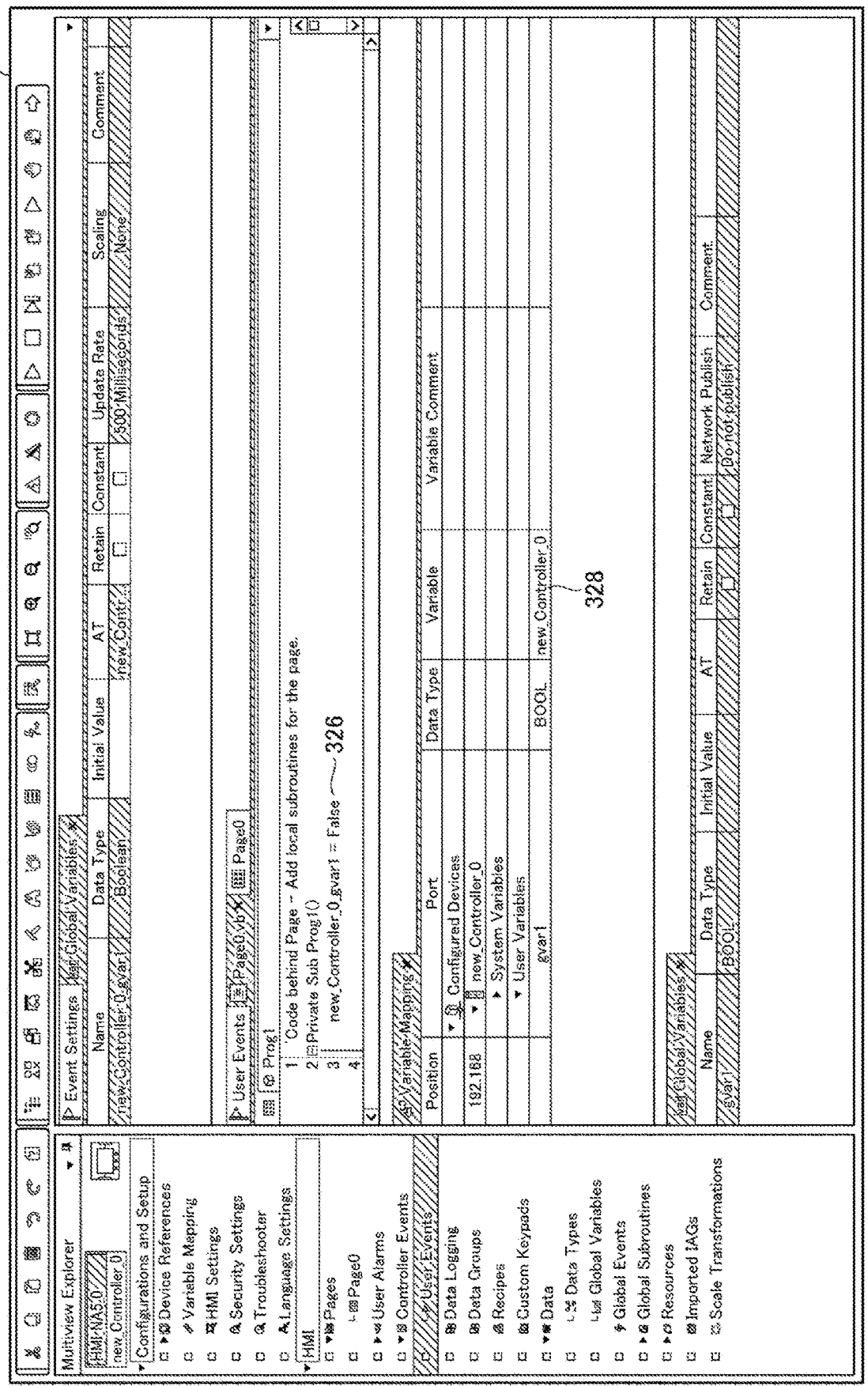
FIG. 19 is a diagram illustrating another example of a setting screen for explaining an operation procedure of associating the HMI with the control device 100 in modularized programming according to the present embodiment.

FIG. 19 is a diagram illustrating another example of a setting screen for explaining an operation procedure of associating the HMI and the control device 100 in modularized programming according to the present embodiment. Referring to FIG. 19, a setting screen 324 is a screen for setting processing executed by the HMI, associated variable, and the like.

The user sets or changes a variable (interface variable) exchanged with the control device 100 which is a connection destination on the setting screen 324. In the example shown in FIG. 19, "new_Controller_0_gvar1" which is an interface variable of the control device 100 is associated with processing executed by the HMI.

FIG. 20 is a diagram illustrating an example of a cross reference which is exported from the HMI in modularized programming according to the present embodiment. Referring to FIG. 20, the program development device 200 exports a cross reference 330 from which a portion referencing a variable relevant to an interface with the control device 100 that is a connection destination is extracted. By exporting the cross reference 330 as shown in FIG. 20, it is possible to easily specify a variable name or the like to be changed during its reuse.

G: Naming Rule

As described above, in a case where there is an overlap in the module name or the variable name, it may be changed to another name which is arbitrarily input by the user, or it may be automatically changed in accordance with a naming rule determined in advance. Hereinafter, an example of a naming rule will be described.

As an example of such a naming rule, an identifier (for example, a numerical value, an alphabet, or the like to be incremented or decremented) that changes according to a rule determined in advance may be added. Specifically, the module name may be changed from "Screw" to "Screw2," and in a case where a module having the same module name "Screw" is further imported, the module name may be changed from "Screw" to "Screw3."

Alternatively, a character string which is determined statically or dynamically may be added. For example, the module name of a corresponding program module may be added to the variable name. By adding the module name of a corresponding program module to a variable, the variable name will not be overlapped insofar as the module name is unique.

In addition, an identifier or a character string may be added to the beginning of a target character string (that is, as a prefix), or an identifier or a character string may be added immediately after a target character string (that is, as a suffix).

Figure 21:
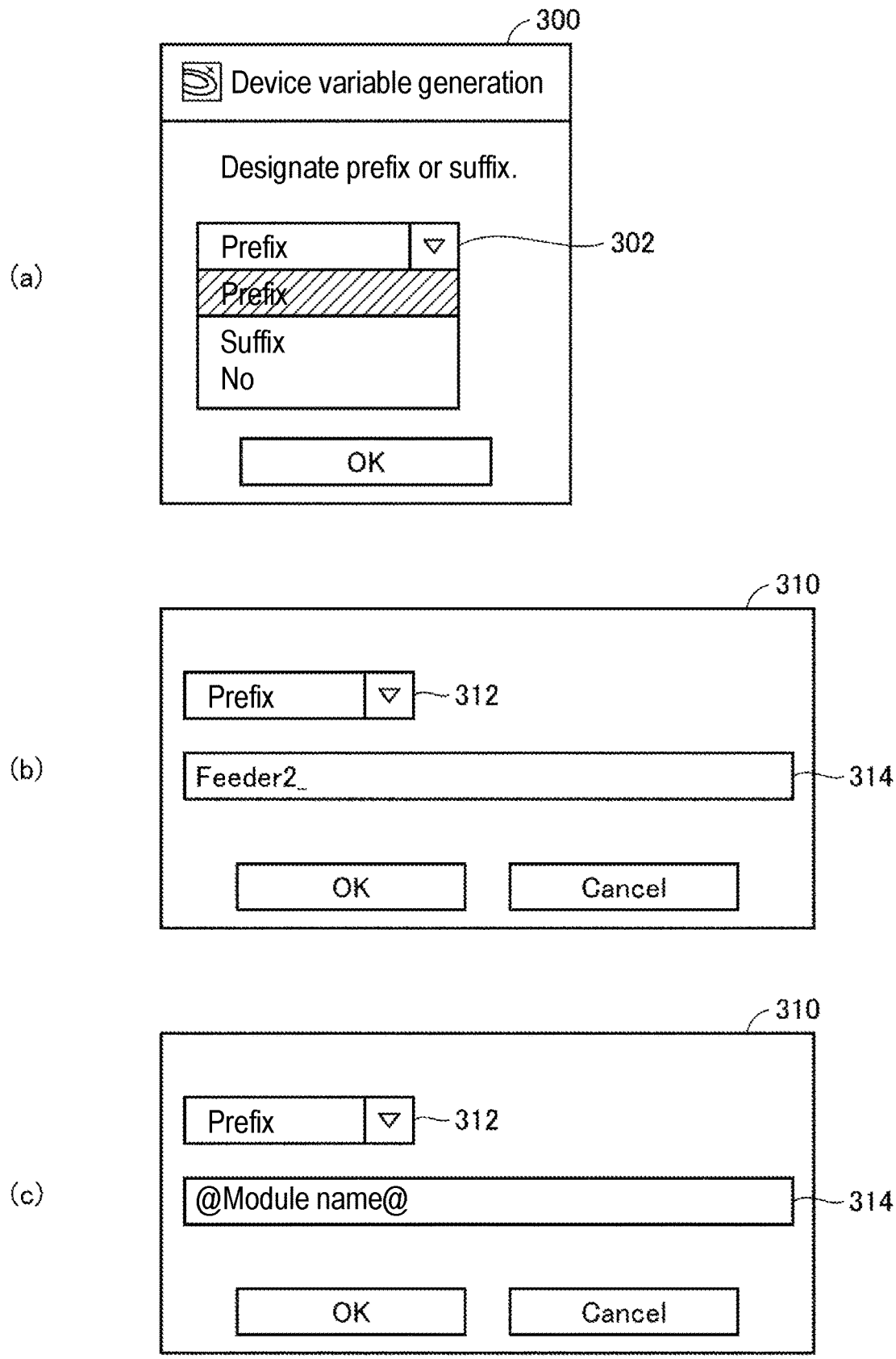
FIG. 21 is a schematic diagram illustrating an example of a setting screen of a naming rule provided in the program development device according to the present embodiment.

FIG. 21 is a schematic diagram illustrating an example of a setting screen of a naming rule provided in the program development device 200 according to the present embodiment. Referring to (a) of FIG. 21, in a case where there is an overlap in the module name or the variable name, the user can operate a pulldown 302 of a setting screen 300 and perform a setting to add some kind of additional information as a "prefix" or a "suffix." Meanwhile, the user can also select not to add any additional information ("none" setting).

As shown in (b) of FIG. 21, the user can operate a pulldown 312 of a setting screen 310 to perform a setting to add some kind of additional information as a "prefix" or a "suffix," and can also designate a character string as additional information in an input box 314.

As shown in (c) of FIG. 21, the user can operate the pulldown 312 of the setting screen 310 to perform a setting to add some kind of additional information as a "prefix" or a "suffix," and can also designate a special character string such as "@module name@" in the input box 314. In this case, the module name of a corresponding program module will be automatically added. A character string determined in advance can also be designated instead of "@module name@."

Meanwhile, for convenience of description, an example in which a common naming rule is applied without distinguishing between a module name and a variable name has been shown, but a naming rule may be applied separately for the module name and the variable name.

As described above, in a case where the name of the program included in the imported program module overlaps the name of the program included in the existing project, the program development device 200 may change the overlapped name of the program in accordance with a naming rule determined in advance.

In addition, in a case where the variable name of the global variable defined as the inter-module I/F 60 included in the imported program module overlaps the variable name of the global variable included in any of the program modules of the existing project, the program development device 200 may change the overlapped variable name in accordance with a naming rule determined in advance.

By adopting the automatic change of the module name or the variable name according to such a naming rule, it is possible to reduce the user's time and effort during reuse of the module. As a result, it is possible to improve the design efficiency and reusability of a program.

H. Addition

The present embodiment as described above includes the following technical ideas.
[Configuration 1]
A program development device (200) for providing a development environment for a user program (50) executed by a control device (100), the program development device comprising:
a storage unit (208) that holds a project including one or a plurality of program modules (70 to 76); and
an update means (202; 250) for importing one or a plurality of program modules into the project,
wherein each of the program modules includes a program and is able to define a first variable (52; 520) which is a variable that is able to be referenced among all program modules included in the project, a second variable (60; 600 to 606) which is a variable that is able to be referenced among a plurality of program modules included in the project, and a third variable (58; 580 to 586) which is a variable referenced in each program module, and the update means is configured to maintain a variable name of the first variable included in the imported program module, and to, in a case where a variable name of the second variable included in the imported program module overlaps a variable name of the second variable included in any of the program modules of the project, accept a change of the overlapped variable name (S114, S116).

[Configuration 2]

The program development device according to configuration 1, wherein, in a case where the variable name of the second variable included in the imported program module is overlapped, the update means presents the overlapped second variable to a user (S116).

[Configuration 3]

The program development device according to configuration 1 or 2, wherein, in a case where the variable name of the second variable included in the imported program module is overlapped, the update means changes the overlapped second variable in accordance with a naming rule determined in advance.

[Configuration 4]

The program development device according to any one of configurations 1 to 3, wherein, in a case where a name of the program included in the imported program module overlaps a name of the program included in any of the program modules of the project, the update means is further configured to accept a change of the overlapped name of the program (S110, S112).

[Configuration 5]

The program development device according to configuration 4, wherein, in a case where the name of the program included in the imported program module is overlapped, the update means presents the overlapped name of the program to a user (S112).

[Configuration 6]

The program development device according to configuration 4 or 5, wherein, in a case where the name of the program included in the imported program module is overlapped, the update means changes the overlapped name of the program in accordance with a naming rule determined in advance.

[Configuration 7]

The program development device according to any one of configurations 1 to 6, wherein import is performed in units of a plurality of program modules having a calling relationship.

[Configuration 8]

The program development device according to any one of configurations 1 to 7, wherein each of the program modules is able to include a definition (54; 540 to 546) of an associated input and output unit, and in a case where a definition of the input and output unit included in the imported program module overlaps a definition of the input and output unit included in any of the program modules of the project, the update means is further configured to accept a change of the overlapped definition of the input and output unit (S106, S108).

[Configuration 9]

A project creation method for creating a project (50) including a user program executed by a control device (100), the method comprising:

a step (208) of holding a project including one or a plurality of program modules, each of the program modules including a program and being able to define a first variable (52; 520) which is a variable that is able to be referenced among all program modules included in the project, a second variable (60; 600 to 606) which is a variable that is able to be referenced among a plurality of program modules included in the project, and a third variable (58; 580 to 586) which is a variable referenced in each program module;

a step (S20) of accepting import of one or a plurality of program modules into the project;

a step (S114) of maintaining a variable name of the first variable included in the imported program module; and a step (S114, S116) of, in a case where a variable name of the second variable included in the imported program module overlaps a variable name of the second variable included in any of the program modules of the project, accepting a change of the overlapped variable name.

[Configuration 10]

A program (250) for implementing a program development device (200) for providing a development environment for a user program executed by a control device (100), the program causing a computer to execute:

a step (208) of holding a project including one or a plurality of program modules, each of the program modules including a program and being able to define a first variable (52; 520) which is a variable that is able to be referenced among all program modules included in the project, a second variable (60; 600 to 606) which is a variable that is able to be referenced among a plurality of program modules included in the project, and a third variable (58; 580 to 586) which is a variable referenced in each program module;

a step (S20) of accepting import of one or a plurality of program modules into the project;

a step (S114) of maintaining a variable name of the first variable included in the imported program module; and a step (S114, S116) of, in a case where a variable name of the second variable included in the imported program module overlaps a variable name of the second variable included in any of the program modules of the project, accepting a change of the overlapped variable name.

I. Advantage

According to the modularized programming of the present embodiment, it is possible to provide a new mechanism capable of improving the design efficiency and reusability of a program executed by the control device.

It is noted that the embodiment disclosed herein is merely illustrative in all aspects and should not be recognized as being restrictive. The scope of the present invention is defined by the scope of claims rather than the description of the embodiment stated above, and is intended to include meanings equivalent to the scope of claims and all modifications within the scope.

What is claimed is:

1. A program development device for providing a development environment for a user program executed by a control device, the program development device comprising:

a storage unit that holds a project including one or a plurality of program modules; and an update means for importing one or a plurality of program modules into the project, wherein each of the program modules includes a program and is able to define a first variable which is a variable that is able to be referenced among all program modules included in the project, a second variable which is a variable that is able to be referenced among a plurality of program modules included in the project, and a third variable which is a variable referenced in each program module, and the update means is configured to maintain a variable name of the first variable included in the imported program module, and to, in a case where a variable name of the second variable included in the imported program module overlaps a variable name of the second variable included in any of the program modules of the project, accept a change of the overlapped variable name.

2. The program development device according to claim 1, wherein, in a case where the variable name of the second variable included in the imported program module is overlapped, the update means presents the overlapped second variable to a user.

3. The program development device according to claim 2, wherein, in a case where the variable name of the second variable included in the imported program module is overlapped, the update means changes the overlapped second variable in accordance with a naming rule determined in advance.

4. The program development device according to claim 2, wherein, in a case where a name of the program included in the imported program module overlaps a name of the program included in any of the program modules of the project, the update means is further configured to accept a change of the overlapped name of the program.

5. The program development device according to claim 2, wherein import is performed in units of a plurality of program modules having a calling relationship.

6. The program development device according to claim 2, wherein each of the program modules is able to include a definition of an associated input and output unit, and in a case where a definition of the input and output unit included in the imported program module overlaps a definition of the input and output unit included in any of the program modules of the project, the update means is further configured to accept a change of the overlapped definition of the input and output unit.

7. The program development device according to claim 1, wherein, in a case where the variable name of the second variable included in the imported program module is overlapped, the update means changes the overlapped second variable in accordance with a naming rule determined in advance.

8. The program development device according to claim 7, wherein, in a case where a name of the program included in the imported program module overlaps a name of the program included in any of the program modules of the project, the update means is further configured to accept a change of the overlapped name of the program.

9. The program development device according to claim 7, wherein import is performed in units of a plurality of program modules having a calling relationship.

10. The program development device according to claim 1, wherein, in a case where a name of the program included in the imported program module overlaps a name of the program included in any of the program modules of the project, the update means is further configured to accept a change of the overlapped name of the program.

11. The program development device according to claim 10, wherein, in a case where the name of the program included in the imported program module is overlapped, the update means presents the overlapped name of the program to a user.

12. The program development device according to claim 11, wherein, in a case where the name of the program included in the imported program module is overlapped, the update means changes the overlapped name of the program in accordance with a naming rule determined in advance.

13. The program development device according to claim 11, wherein import is performed in units of a plurality of program modules having a calling relationship.

14. The program development device according to claim 10, wherein, in a case where the name of the program included in the imported program module is overlapped, the update means changes the overlapped name of the program in accordance with a naming rule determined in advance.

15. The program development device according to claim 14, wherein import is performed in units of a plurality of program modules having a calling relationship.

16. The program development device according to claim 10, wherein import is performed in units of a plurality of program modules having a calling relationship.

17. The program development device according to claim 1, wherein import is performed in units of a plurality of program modules having a calling relationship.

18. The program development device according to claim 1, wherein each of the program modules is able to include a definition of an associated input and output unit, and in a case where a definition of the input and output unit included in the imported program module overlaps a definition of the input and output unit included in any of the program modules of the project, the update means is further configured to accept a change of the overlapped definition of the input and output unit.

19. A project creation method for creating a project including a user program executed by a control device, the method comprising:

a step of holding a project including one or a plurality of program modules, each of the program modules including a program and being able to define a first variable which is a variable that is able to be referenced among all program modules included in the project, a second variable which is a variable that is able to be referenced among a plurality of program modules included in the project, and a third variable which is a variable referenced in each program module;

a step of accepting import of one or a plurality of program modules into the project;

a step of maintaining a variable name of the first variable included in the imported program module; and a step of, in a case where a variable name of the second variable included in the imported program module overlaps a variable name of the second variable included in any of the program modules of the project, accepting a change of the overlapped variable name.

20. A non-transitory computer readable storage medium, storing a program for implementing a program development device for providing a development environment for a user program executed by a control device, the program causing a computer to execute:

a step of holding a project including one or a plurality of program modules, each of the program modules including a program and being able to define a first variable which is a variable that is able to be referenced among all program modules included in the project, a second variable which is a variable that is able to be referenced among a plurality of program modules included in the project, and a third variable which is a variable referenced in each program module;
a step of accepting import of one or a plurality of program modules into the project;
a step of maintaining a variable name of the first variable included in the imported program module; and
a step of, in a case where a variable name of the second variable included in the imported program module overlaps a variable name of the second variable included in any of the program modules of the project, accepting a change of the overlapped variable name.

* * * * *